United States Patent
Matsumoto

(10) Patent No.: US 9,518,751 B2
(45) Date of Patent: Dec. 13, 2016

(54) INDOOR UNIT OF AIR-CONDITIONING APPARATUS

(71) Applicant: Mitsubishi Electric Corporation, Tokyo (JP)

(72) Inventor: Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 461 days.

(21) Appl. No.: 14/049,704

(22) Filed: Oct. 9, 2013

(65) Prior Publication Data

US 2014/0138043 A1  May 22, 2014

(30) Foreign Application Priority Data

Nov. 16, 2012 (JP) ................................. 2012-252019

(51) Int. Cl.
  *F24F 11/00* (2006.01)
  *F24F 1/00* (2011.01)

(52) U.S. Cl.
  CPC .......... *F24F 11/0012* (2013.01); *F24F 1/0007* (2013.01); *F24F 11/0034* (2013.01);
  (Continued)

(58) Field of Classification Search
  CPC .. F24F 11/0078; F24F 11/0034; F24F 1/0007; F24F 11/0012; F24F 2001/0048; F24F 11/0079; F24F 2001/0061; F24F 2011/0068; Y02B 30/746
  (Continued)

(56) References Cited

U.S. PATENT DOCUMENTS 5,180,333 A * 1/1993 Shyu ........................ F24F 11/00
  236/49.3
5,251,814 A * 10/1993 Warashina ............ F24F 1/0007
  236/49.3
(Continued)

FOREIGN PATENT DOCUMENTS

CN  203595185 U  5/2014
JP  10-160580 A  6/1998
(Continued)

OTHER PUBLICATIONS

Office Action mailed on Nov. 18, 2014 in corresponding JP Application No. 2012-252019 (with English translation).
(Continued)

*Primary Examiner* — Tho V Duong
*Assistant Examiner* — Raheena Rehman
(74) *Attorney, Agent, or Firm* — Posz Law Group, PLC

(57) ABSTRACT

An indoor unit of an air-conditioning apparatus includes an indoor imaging device that captures an image of inside a room, a thermal image detection device that acquires a thermal image of inside the room, an arithmetic operation device that acquires an air flow inside the room and that generates an air-conditioning status image obtained by superimposing the air flow obtained by the arithmetic operation and the thermal image acquired by the thermal image detection device on a visible image captured by the indoor imaging device, and a storage device that stores therein air-conditioning status images in accordance with the lapse of time. When a visualization button on a remote control is pressed, air-conditioning status images are transmitted to the remote control and are displayed as time-reduced moving images on a display unit of the remote control.

9 Claims, 15 Drawing Sheets

(52) U.S. Cl.
 CPC ...... *F24F 11/0078* (2013.01); *F24F 11/0079* (2013.01); *F24F 2011/0061* (2013.01); *F24F 2011/0068* (2013.01); *Y02B 30/746* (2013.01)

(58) Field of Classification Search
 USPC ................................................ 165/11.1, 11.2
 See application file for complete search history.

(56) References Cited

U.S. PATENT DOCUMENTS

| | | | | |
|---|---|---|---|---|
| 5,331,825 | A * | 7/1994 | Kim | F24F 11/0034 236/51 |
| 5,372,545 | A * | 12/1994 | Noda | F24F 11/0034 236/51 |
| 5,875,639 | A * | 3/1999 | Kim | F24F 11/0078 236/51 |
| 6,636,272 | B1 * | 10/2003 | Noguchi | H04B 1/202 340/12.22 |
| 2007/0150078 | A1 * | 6/2007 | Tanabe | G08C 17/00 700/33 |
| 2009/0090125 | A1 * | 4/2009 | Seki | F24F 11/0078 62/407 |
| 2010/0168922 | A1 * | 7/2010 | Park | F24F 11/0034 700/276 |
| 2013/0098576 | A1 * | 4/2013 | Fujitaka | F24F 1/0007 165/11.1 |
| 2013/0284417 | A1 * | 10/2013 | Taira | F24F 1/0033 165/237 |

FOREIGN PATENT DOCUMENTS

| | | |
|---|---|---|
| JP | H11-213272 A | 8/1999 |
| JP | 2008-286725 A | 11/2008 |
| JP | 2009-293920 A | 12/2009 |
| JP | 2011-247451 A | 12/2011 |
| JP | 2011-257071 A | 12/2011 |
| JP | 2011257071 A * | 12/2011 |

OTHER PUBLICATIONS

Office Action issued Nov. 4, 2015 in the corresponding CN application No. 201310573944.3 (with English translation).
Office Action issued Jun. 17, 2016 in the corresponding CN application No. 201310573944.3 (with English translation).

* cited by examiner

INDOOR UNIT OF AIR-CONDITIONING APPARATUS

TECHNICAL FIELD

The present invention relates to air-conditioning apparatuses, and more specifically, it relates to an indoor unit of an air-conditioning apparatus including reporting means for reporting operation status.

BACKGROUND ART

Hitherto, as air-conditioning apparatuses including reporting means for reporting operation status, an air-conditioning apparatus which is mainly oriented to energy saving and in which power consumption or electricity charge is displayed on a display device arranged in the air-conditioning apparatus or a remote control has been disclosed (for example, see Patent Literature 1).

CITATION LIST

Patent Literature

[Patent Literature 1] Japanese Unexamined Patent Application Publication No. 2009-293920 (Pages 3 to 4, FIG. 2)

SUMMARY OF INVENTION

Technical Problem

The air-conditioning apparatus disclosed in Patent Literature 1 includes measuring means for measuring power consumption or electricity charge. In the case where the operation of the air-conditioning apparatus is stopped by a stop button on the remote control, the power consumption or electricity charge integrated from the start to termination of the current operation measured by the measuring means is displayed on the display device. In addition, during an operation, the power consumption or electricity charge at a certain instant of time is displayed. Furthermore, after an operation is terminated, the details of the past electricity charge (electricity charge from the start to termination of the previous operation) or the total amount of electricity charge for the current month obtained by accumulating the past electric charges is displayed. Thus, the air-conditioning apparatus has the problems described below.

That is, although a user is able to understand the magnitude of the value of power consumption or electric charge, the user cannot comprehend the air-conditioning status of inside a room (air-conditioned space) when the value of the power consumption or electricity charge is large. Thus, there is a problem in which the user does not know how energy saving should be carried out with user's comfort ensured.

Accordingly, in order to implement energy saving in the case where the value of power consumption or electricity charge is large in cooling (or heating operation), the user is simply required to increase (decrease) the set temperature and endure a higher (or lower) temperature. Furthermore, a situation may occur in which the area where a user is located is not sufficiently cooled (or heated) even though an extremely cooled (heated) area locally exists or an excessively wide area including the position where the user is located is cooled (or heated).

The present invention solves the problems mentioned above and obtains an indoor unit of an air-conditioning apparatus that is capable of displaying the air-conditioning status of inside a room.

Solution to Problem

An indoor unit of an air-conditioning apparatus according to the present invention includes a main unit that includes an air inlet and an air outlet and is installed inside a room; a fan configured to suck indoor air from the air inlet and form an air path extending to the air outlet; a heat exchanger installed in the air path and configured to partially perform a role of a refrigeration cycle; an air flow direction adjusting device installed at the air outlet and configured to adjust a blowing direction of air conditioned by the heat exchanger; an indoor imaging device configured to capture an image of inside of the room; a thermal image detection device configured to acquire a thermal image of the inside of the room; a controller configured to transmit operation control information for controlling the heat exchanger, the fan, and the air flow direction adjusting device to the heat exchanger, the fan, and the air flow direction adjusting device; an arithmetic operation device configured to calculate, by an arithmetic operation, a flow of air blown from the air outlet on a basis of the operation control information, and generate an air-conditioning status image, which is an image obtained by superimposing the air flow calculated by the arithmetic operation and the thermal image representing temperature distribution acquired by the thermal image detection device on a visible image captured by the indoor imaging device; a storage device configured to store the air-conditioning status image; and; a remote control configured to receive the air-conditioning status image stored in the storage device, the remote control having a display unit on which the received air-conditioning status image is displayed. Air-conditioning status images are generated by the arithmetic device with predetermined time intervals. The air-conditioning status images are displayed as moving images on the display unit of the remote control.

Advantageous Effects of Invention

In an indoor unit of an air-conditioning apparatus according to the present invention, air-conditioning status images are generated with predetermined time intervals, and the air-conditioning status images are displayed as moving images on a display unit of a remote control. Thus, a user is able to understand at a glance the transition (change) of the air-conditioning status of inside a room.

DESCRIPTION OF EMBODIMENTS

Embodiment 1

Figure 1:
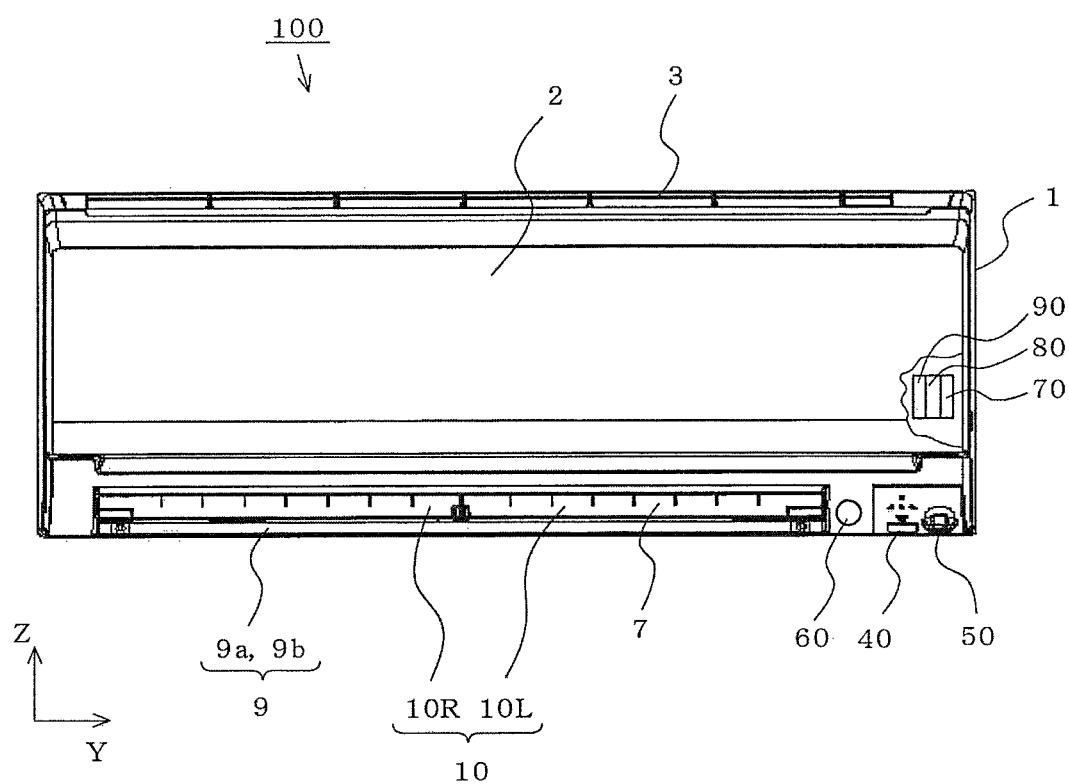
FIG. 1 is a front view for explaining an indoor unit of an air-conditioning apparatus according to Embodiment 1 of the present invention.
Figure 2:
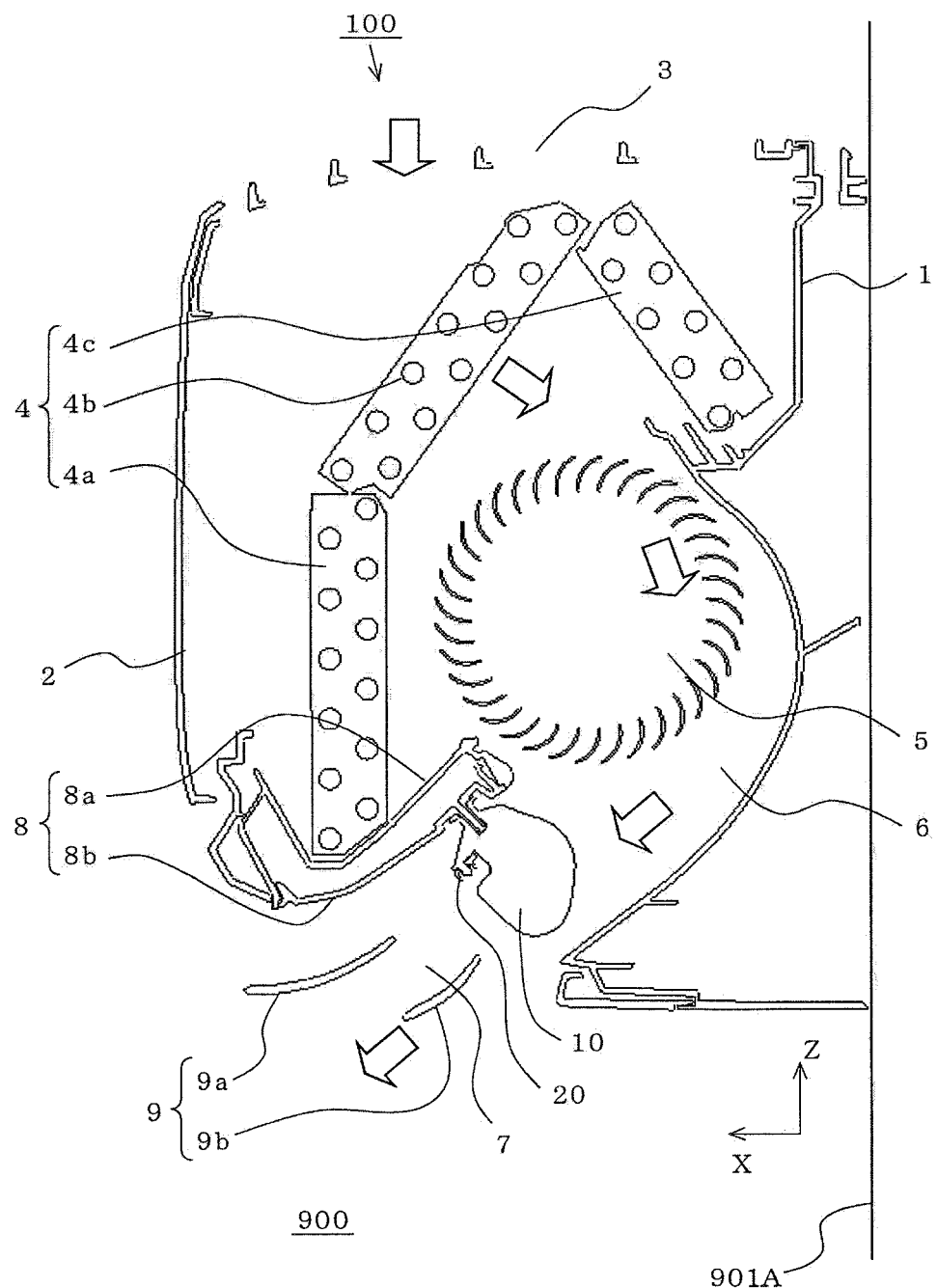
FIG. 2 is a side cross-sectional view of the indoor unit of the air-conditioning apparatus illustrated in FIG. 1.
Figure 3:
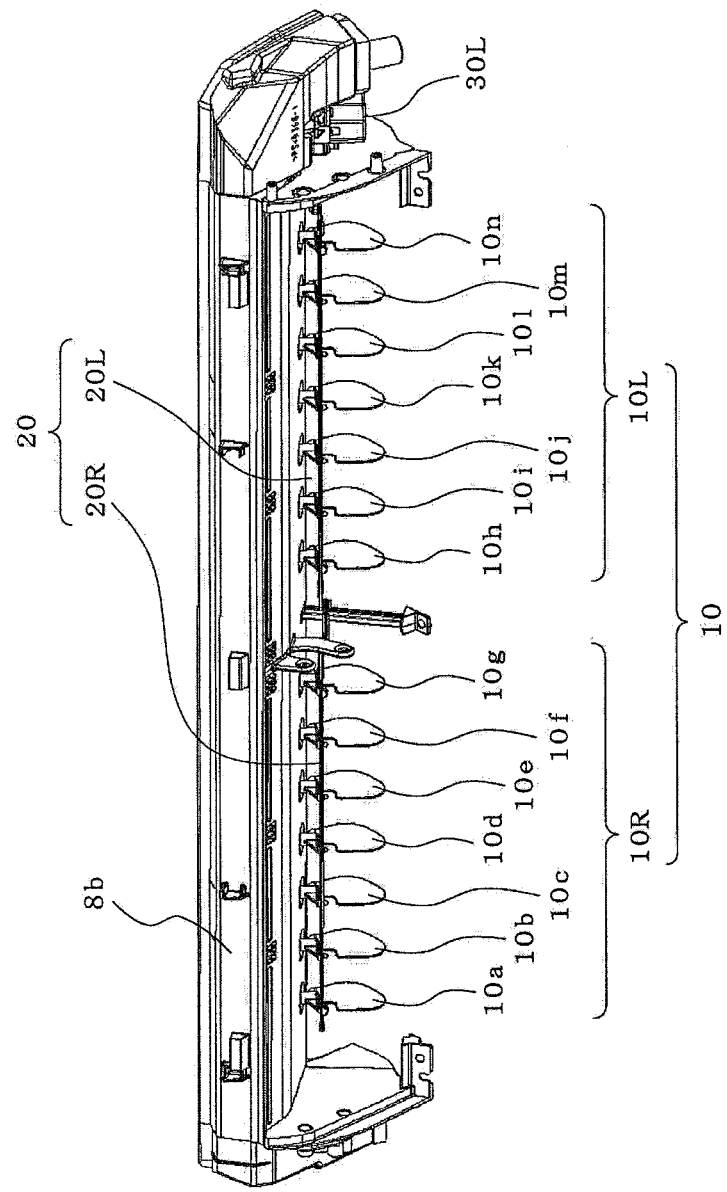
FIG. 3 is a perspective view illustrating an extracted part near an air outlet of the indoor unit of the air-conditioning apparatus illustrated in FIG. 1.
Figure 4:
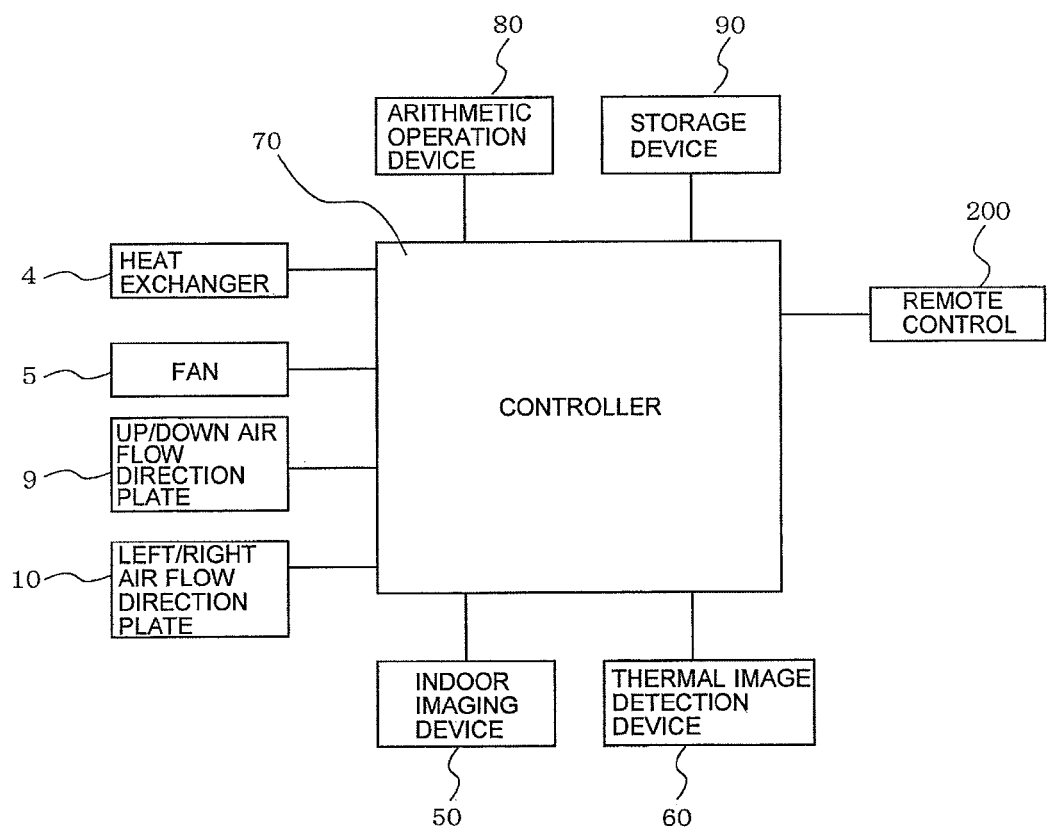
FIG. 4 is a block diagram illustrating the configuration of a controller of the indoor unit of the air-conditioning apparatus illustrated in FIG. 1.
Figure 5:
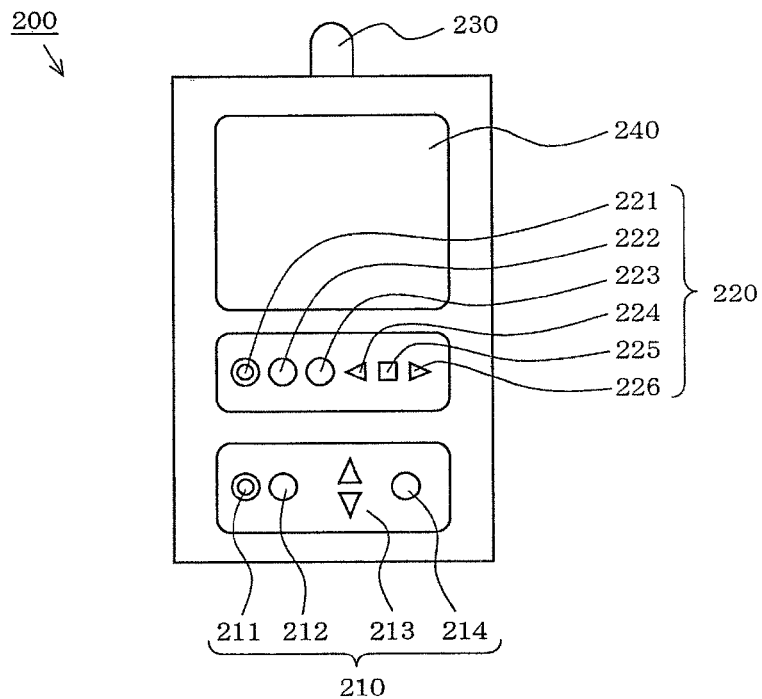
FIG. 5 is a front view of a remote control of the indoor unit of the air-conditioning apparatus illustrated in FIG. 1.

FIGS. 1 to 5 explain an indoor unit of an air-conditioning apparatus according to Embodiment 1 of the present invention. FIG. 1 is a front view, FIG. 2 is a side cross-sectional view, FIG. 3 is a perspective view (of the periphery of an air outlet) which is partially extracted, FIG. 4 is a block diagram illustrating the configuration of a controller, and FIG. 5 is a front view of a remote control. These figures are schematically illustrated and do not intend to limit the present invention to the illustrated forms.

(Indoor Unit)

Referring to FIGS. 1 and 2, an indoor unit 100 of an air-conditioning apparatus (hereinafter, referred to as an "indoor unit") is installed on any wall surface 901A inside a room 900 (hereinafter, referred to as an "installation wall surface") and includes a main unit 1, on an upper part of which an air inlet 3 is provided and on a lower part of which an air outlet 7 is provided, a front panel 2 that can freely open and close to cover the front face of the main unit 1, a fan 5 that sucks indoor air from the air inlet 3 and forms an air path 6 extending to the air outlet 7, and a heat exchanger 4 that is arranged on the upstream side of the fan 5 (in the proximity to the air inlet 3). An up/down air flow direction plate 9 that adjusts the blowing direction of air conditioned in the heat exchanger 4 (hereinafter, referred to as "conditioned air") is arranged at the air outlet 7.

Furthermore, an indoor imaging device 50 that captures images of inside the room 900, a thermal image detection device 60 that acquires thermal images of inside the room 900, and a main unit communication device 40 that transfers signals to and from a remote control (transmission and reception) (equivalent to a wireless remote control) 200 are installed on the front face of the main unit 1.

(Heat Exchanger)

Referring to FIG. 2, the heat exchanger 4 includes a heat exchanger front portion 4a, which is a portion that is substantially parallel to the front panel 2, a heat exchanger upper front portion 4b, which is a portion that is diagonally upper near the front side of the fan 5, and a heat exchanger upper rear portion 4c, which is a portion that is diagonally upper near the rear side of the fan 5. A drain pan 8 is arranged below the heat exchanger front portion 4a. An upper surface 8a of the drain pan 8 forms a drain pan surface that actually receives drain, and a lower surface 8b of the drain pan 8 forms a front side of the air path 6.

(Air Flow Direction Adjusting Device)

Referring to FIGS. 2 and 3, a left-side left/right air flow direction plate group 10L and a right-side left/right air flow direction plate group 10R (collectively or individually referred to as a "left/right air flow direction plate 10") that adjust the horizontal (left/right) blowing direction of indoor air conditioned by the heat exchanger 4 (hereinafter, referred to as "conditioned air") are arranged in the air path near the air outlet 7. An up/down air flow direction plate 9 (a front up/down air flow direction plate 9a and a rear up/down air flow direction plate 9b are collectively referred to as an "up/down air flow direction plate 9") that adjusts the vertical (up/down) blowing direction of conditioned air is arranged at the air outlet 7, which is located at the end of the air path 6. The left/right air flow direction plate 10 and the up/down air flow direction plate 9 function as an air flow direction adjusting device.

The "left-side" plate and the "right-side" plate represent a plate that can be viewed on the left hand side and a plate that can be viewed on the right hand side, respectively, when the room is viewed from the indoor unit 100, that is, when the direction toward the front panel 2 is viewed from the rear side of the main unit 1.

(Up/Down Air Flow Direction Plate)

Referring to FIG. 2, the up/down air flow direction plate 9 has a rotational center that is parallel to a horizontal direction and is rotatably arranged at the main unit 1. The rotational axis of the front up/down air flow direction plate 9a and the rotational axis of the rear up/down air flow direction plate 9b are connected by a link mechanism or a gear mechanism and are moved rotationally by a common driving motor.

The up/down air flow direction plate 9 in the present invention is not limited by the illustrated form. The front up/down air flow direction plate 9a and the rear up/down air flow direction plate 9b may be moved rotationally by different driving motors. Furthermore, the front up/down air flow direction plate 9a and the rear up/down air flow direction plate 9b may each be divided at the center thereof in the left/right direction, and the divided four plates may be moved rotationally in an independent manner.

(Left/Right Air Flow Direction Plate)

Referring to FIG. 3, the right-side left/right air flow direction plate group 10R includes left/right air flow direction plates 10a, 10b, . . . , and 10g. The right-side left/right air flow direction plate group 10R is rotatably arranged at the lower surface 8b of the drain pan 8 and is connected to a right-side connecting bar 20R. The left-side left/right air flow direction plate group 10L includes left/right air flow direction plates 10h, 10i, . . . , and 10n and is connected to a left-side connecting bar 20L.

The right-side left/right air flow direction plate group 10R and the right-side connecting bar 20R form a link mechanism, and the left-side left/right air flow direction plate group 10L and the left-side connecting bar 20L form a link mechanism. Right-side driving means (not illustrated) is connected to the right-side connecting bar 20R, and left-side driving means 30L is connected to the left-side connecting bar 20L.

Accordingly, when the right-side connecting bar 20R is translated by the right-side driving means, the left/right air flow direction plates 10a, 10b, . . . , and 10g move rotationally while keeping parallel to one another. Furthermore, when the left-side connecting bar 20L is translated by the left-side driving means 30L, the left/right air flow direction plates 10h, 10i, . . . , and 10n move rotationally while keeping parallel to one another. Thus, conditioned air can be blown in the same direction over the entire width of the air outlet 7, conditioned air can be blown in opposite directions between one half and the other half of the width the air outlet 7, the directions being away from each other, or conditioned air can be blown in opposite directions between one half and the other half of the width of the air outlet 7, the directions colliding with each other.

The left/right air flow direction plate 10 in the present invention is not limited by the illustrated form. The number of plates of the left/right air flow direction plate 10 is not particularly limited. Furthermore, the left/right air flow direction plate 10 may be divided into three or more groups. In this case, the individual groups may be rotatably connected to corresponding connecting bars, and the connecting bars may be translated independently.

(Controller)

Referring to FIG. 4, a controller 70 that transmits operation control information for controlling the operation of the heat exchanger 4, the fan 5, the up/down air flow direction plate 9, and the left/right air flow direction plate 10 to the heat exchanger 4, the fan 5, the up/down air flow direction plate 9, and left/right air flow direction plate 10, respectively, an arithmetic operation device 80 that obtains, by an arithmetic operation, the flow status of conditioned air blown from the air outlet 7 on the basis of the operation control information transmitted from the controller 70 and a visible image captured by the indoor imaging device 50 and that generates an "air-conditioning status image (this will be explained in detail separately)", which is an image obtained by superimposing the air flow obtained by the arithmetic operation and a thermal image representing the temperature distribution acquired by the thermal image detection device 60 on a visible image, which is an image captured by the indoor imaging device 50, and a storage device 90 that stores therein air-conditioning status images generated by the arithmetic operation device 80 in accordance with the lapse of time are provided in the main unit 1.

That is, air-conditioning status images are stored in the storage device 90 with specific time intervals (for example, five seconds).

As described above, the controller 70 controls the operation of the heat exchanger 4, the fan 5, the up/down air flow direction plate 9, and the left/right air flow direction plate 10 on the basis of air-conditioning conditions set by the remote control 200. At the same time, the controller 70 transmits a visible image captured by the indoor imaging device 50 to the arithmetic operation device 80, transmits a thermal image acquired by the thermal image detection device 60 to the arithmetic operation device 80, transmits the operation control information to the arithmetic operation device 80, and transmits an air-conditioning status image (more accurately, "air-conditioning status image data") generated by the arithmetic operation device 80 to the storage device 90.

In the case where the flow status of conditioned air is calculated by an arithmetic operation without the temperature of the conditioned air is taken into consideration, since information for controlling the operation of the heat exchanger 4 is deleted from the control information, the arithmetic operation device 80 calculates the flow status of the conditioned air by an arithmetic operation on the basis of the operation control information for controlling the operation of the fan 5, the up/down air flow direction plate 9, and the left/right air flow direction plate 10 and the visible image captured by the indoor imaging device 50.

(Remote Control)

Referring to FIG. 5, the remote control 200 sets air-conditioning conditions and transmits a signal corresponding to the air-conditioning conditions to the main unit 1 (the main unit communication device 40). The remote control 200 also requests the main unit 1 (the main unit communication device 40) to transmit an air-conditioning status image and receives the air-conditioning status image.

The remote control 200 includes, on the surface thereof, an air-conditioning condition input unit 210 for allowing a user to input air-conditioning conditions (the temperature of conditioned air and the blowing direction and blowing strength of the conditioned air) and allowing the user to issue an instruction to start/stop operation, an air-conditioning status image request unit 220 that requests the main unit 1 to transmit an air-conditioning status image, a display unit 240 that displays thereon air-conditioning conditions input by the air-conditioning condition input unit 210 or an air-conditioning status image transmitted from the main unit 1 (the main unit communication device 40) and received by the remote control 200, and a remote control communication unit 230 that enables communication with the main unit 1 (the main unit communication device 40).

The air-conditioning condition input unit 210 includes an operation mode switching button 211 for switching between heating, cooling, and dry, an operation start/end button 212 for designating starting or ending of an operation, a temperature setting button 213 for increasing or decreasing the set temperature of conditioned air, and a blowing setting button 214 for setting the blowing direction and blowing strength of conditioned air.

The air-conditioning status image request unit 220 includes an air-conditioning status image request button (hereinafter, referred to as a "visualization button") 221 for issuing a request to transmit an air-conditioning status image, a display method change button 222 for chancing the display method of an air-conditioning status image, a display speed change button 223 for changing the display speed (playback speed) for displaying (playing back) an air-conditioning status image, a display time backward button 224 for setting the display time backward (go back), a display time fixing button 225 for temporarily stopping the progress of time and displaying an air-conditioning status image at a point in time for a long time, and a display time forward button 226 for setting the display time forward toward the current time.

The case where an air-conditioning status image is displayed on the display unit 240 at the same time as the reception (in synchronization with the reception) of transmission from the main unit 1 (the storage device 90) has been described above. However, an air-conditioning status image transmitted from the main unit 1 (the storage device 90) may be temporarily stored in the remote control 200, and the air-conditioning status image stored in the remote control 200 may be displayed in the display unit 240. At this time, the remote control 200 includes an air-conditioning status image display button (not illustrated) for starting display on the display unit 240, in addition to a remote control storage device (not illustrated) for temporarily storing an air-conditioning status image and the visualization button (the air-conditioning status image request button) 221.

The remote control 200 may be a wireless remote control or may be connected through wiring. Furthermore, the remote control 200 may be a portable information terminal (a cellular phone, a tablet terminal, or a smart phone).

(Storing of Air-Conditioning Status Image Data)

Figure 6:
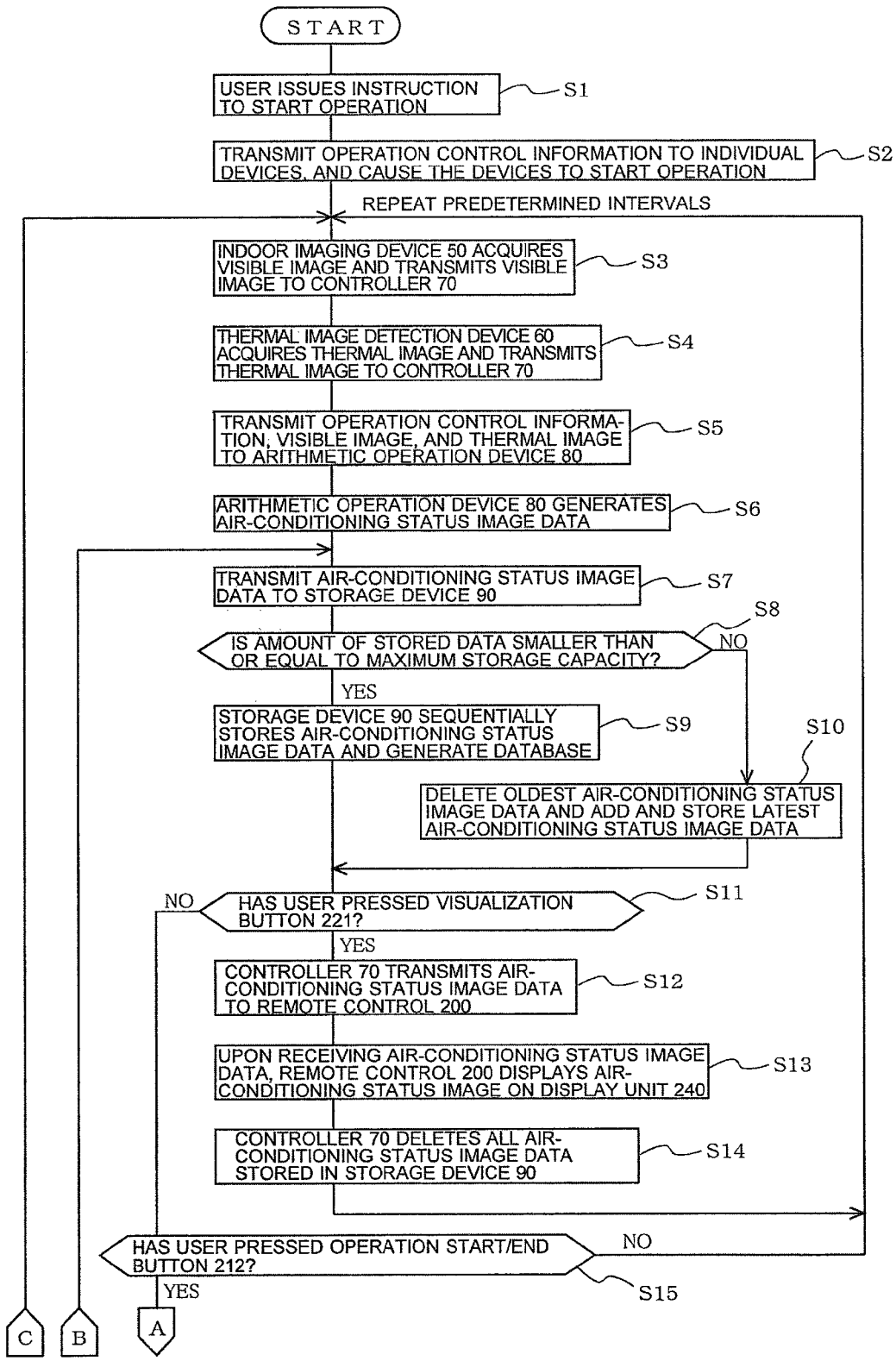
FIG. 6 is a flowchart for explaining the flow of control for the indoor unit of the air-conditioning apparatus illustrated in FIG. 1.
Figure 7:
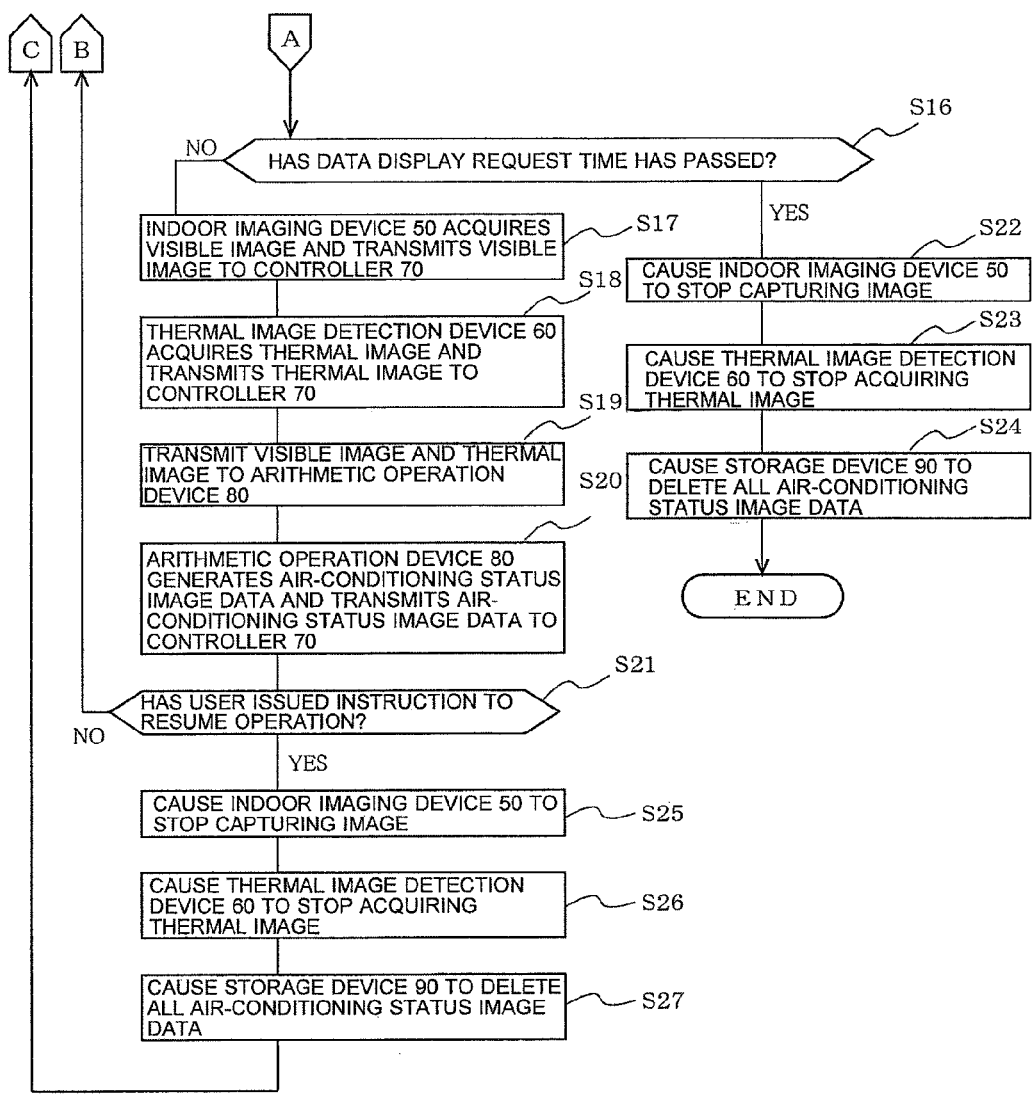
FIG. 7 is a flowchart for explaining the flow of control for the indoor unit of the air-conditioning apparatus illustrated in FIG. 1.

FIGS. 6 and 7 are flowcharts for explaining the flow of control for displaying an air-conditioning status image in the indoor unit of the air-conditioning apparatus according to Embodiment 1 of the present invention.

Referring to FIGS. 6 and 7, when a user operates the air-conditioning condition input unit 210 arranged on the remote control 200 to set air-conditioning conditions (in the case where an operation is performed under the air-conditioning conditions set for the last operation, setting is not performed) and issues an instruction to start operation (S1), the controller 70 transmits operation control information to respective devices in such a manner that the operation is performed under the set air-conditioning conditions, and starts the operation (S2).

After the operation starts, the indoor imaging device 50 acquires visible images by capturing images of inside the room 900 with predetermined intervals (for example, every ten seconds) and transmits the acquired visible images to the controller 70 (S3). Furthermore, the thermal image detection device 60 acquires thermal images of inside the room 900, and transmits the acquired thermal images to the controller 70 (S4). The controller 70 transmits the operation control information, the visible images, and the thermal images to the arithmetic operation device 80 (S5).

The arithmetic operation device 80 performs an arithmetic operation for an air flow image of inside the room 900 on the basis of operation control information, a visible image, and a thermal image, generates an air-conditioning status image (more accurately, air-conditioning status image data) obtained by superimposing the thermal image and the air flow image on the visible image, and transmits the air-conditioning status image data to the controller 70 (S6).

Then, the controller 70 transmits the air-conditioning status image data to the storage device 90 (S7). In the case where the amount of data stored up to that time is smaller than or equal to the maximum storage capacity, which is the predetermined upper limit (S8), the storage device 90 sequentially stores the transmitted air-conditioning status image data to generate a database (S9).

In contrast, in the case where the amount of data stored up to that time exceeds the maximum storage capacity (S8), the storage device 90 deletes the oldest air-conditioning status image data, and adds and stores the latest air-conditioning status image data (S10).

The above-mentioned steps (S3 to S10) are repeated with specific intervals until the user presses the visualization button 221 arranged on the remote control 200 (S11) or the user presses the operation start/end button 212 arranged on the remote control 200 (S15). Air-conditioning status image data acquired with time intervals are sequentially added to the storage device 90, and a database is generated in the storage device 90.

(Display of Air-Conditioning Image)

When the user desires to view an air-conditioning status image, the user first presses the visualization button 221 arranged on the remote control 200 (S11). The visualization button 221 may be pressed while an operation is being performed or after an operation is terminated.

(Display of Air-Conditioning Status Image During Operation)

When the visualization button 221 is pressed while an operation is being performed (S11), the controller 70 recognizes that transmission of air-conditioning status image data to the remote control is requested, and transmits air-conditioning status image data stored in the storage device 90 to the remote control 200 (S12). At this time, transmission is performed at a high speed, which is a speed obtained by reducing intervals (time intervals) for actual storage at a predetermined ratio (for example, reduced to $\frac{1}{50}$). Then, the remote control 200 receives the air-conditioning status image data, and displays a corresponding air-conditioning status image on the display unit 240 (S13).

Furthermore, the controller 70 deletes all the air-conditioning status image data stored in the storage device 90 up to that time (S14). At the same time, the indoor imaging device 50 acquires visible images by capturing images of inside the room 900 with predetermined intervals (for example, ten seconds), and resumes execution of (S3) for transmitting the visible images to the controller 70 and later steps (return to S3).

Accordingly, after air-conditioning status images are temporarily displayed, the air-conditioning status image data are stored in the storage device 90.

In the case where the visualization button 221 is not pressed (S11) and the operation start/end button 212 is not pressed (S15), since the operation of the indoor unit 100 (refrigeration cycle or the like) is being continuously performed, the indoor imaging device 50 acquires visible images by capturing images of inside the room 900 with predetermined intervals (for example, ten seconds), and resumes execution of (S3) for transmitting the acquired visible images to the controller 70 and later steps (return to S3).

(After Operation is Terminated)

In contrast, in the case where the operation start/end button 212 is pressed (S15), the indoor imaging device 50 acquires visible images by capturing images of inside the room 900 with predetermined intervals (for example, ten seconds) and transmits the acquired visible images to the controller 70 (S17) until a predetermined data display request time has passed (for example, three hours have passed since pressing of the operation start/end button 212). Furthermore, the thermal image detection device 60 acquires thermal images, and transmits the acquired thermal images to the controller 70 (S18). Then, the controller 70 transmits the visible images and the thermal images to the arithmetic operation device 80 (S19).

The arithmetic operation device 80 generates an air-conditioning status image (more accurately, air-conditioning status image data) obtained by superimposing a thermal image on a visible image, and transmits the generated air-conditioning status image data to the controller 70 (S20). Furthermore, the controller 70 continues to transmit air-conditioning status image data to the storage device 90 (S7) as in the period during which an operation is being performed, unless the user presses the operation start/end button 212 again (S21).

(Termination of Control)

In the case where the display request time has passed (S16) after the operation start/end button 212 is pressed (S15) or in the case where operation is resumed (S21) before the display request time has passed after the operation start/end button 212 is pressed (S15), it is determined that the user does not desire to view air-conditioning status images up to that time. The controller 70 causes the indoor imaging device 50 to stop capturing an image of inside the room 900 (S22, S25), causes the thermal image detection device 60 to stop acquiring a thermal image of inside the room 900 (S23, S26), deletes all the air-conditioning status image data stored in the storage device 90 (S24, S27), and terminates the control (END).

Accordingly, even after an operation is terminated, new air-conditioning status image data are sequentially added until the display request time has passed. When the amount of air-conditioning status image data reaches the maximum storage capacity, deletion is performed from the oldest air-conditioning status image data.

In contrast, after the display request time has passed or when an operation resumes before the display request time has passed, all the air-conditioning status image data stored in the storage device 90 are deleted. Thus, when an operation resumes, no air-conditioning status image data is stored in the storage device 90.

In the case where the user operates the air-conditioning condition input unit 210 arranged on the remote control 200 to change air-conditioning conditions during execution of the above-mentioned steps (S3 to S6), changed operation control information is transmitted to respective devices in such a manner that control is performed under the changed air-conditioning conditions.

The case where reception of air-conditioning status image data transmitted from the main unit 1 (the storage device 90) and displaying of an air-conditioning status image are synchronized with each other has been described above. However, the present invention is not limited to this. All the air-conditioning status image data stored in the storage device 90 may be collectively transmitted from the main unit 1 (the storage device 90) to the remote control 200. After the remote control 200 temporarily stores therein the received air-conditioning status image data, air-conditioning status images corresponding to air-conditioning status image data stored in the remote control 200 may be sequentially displayed on the display unit 240 in a form in which time is reduced.

Furthermore, although the case where the remote control 200 includes the air-conditioning condition input unit 210 and the air-conditioning status image request unit 220 has been described above, the present invention is not limited to this. The display unit 240 may be of a touch panel, and the air-conditioning condition input unit 210 and the air-conditioning status image request unit 220 may be removed from the remote control 200. At the same time, buttons corresponding to the air-conditioning condition input unit 210 and the air-conditioning status image request unit 220 may be displayed on the display unit 240 so that functions of the air-conditioning condition input unit 210 and the air-conditioning status image request unit 220 can be implemented.

(Example 1 of Air-Conditioning Status Image)

FIGS. 8 and 9 are front views of a display unit of a remote control in the case where a heating operation is performed by concentrated (spot) blowing, for explaining an air-conditioning status image in the indoor unit of the air-conditioning apparatus according to Embodiment 1 of the present invention.

FIGS. 8 and 9 illustrate air-conditioning status images stored in the storage device 90 during a period from start to termination of the latest operation, and schematically explain that an air-conditioning status image changes with time. Since an air-conditioning status image greatly changes in accordance with the size of the room 900 and the blowing amount and blowing strength (blowing speed) of conditioned air, the actual air-conditioning status does not necessarily correspond to an illustrated air-conditioning status image.

Figure 8A:
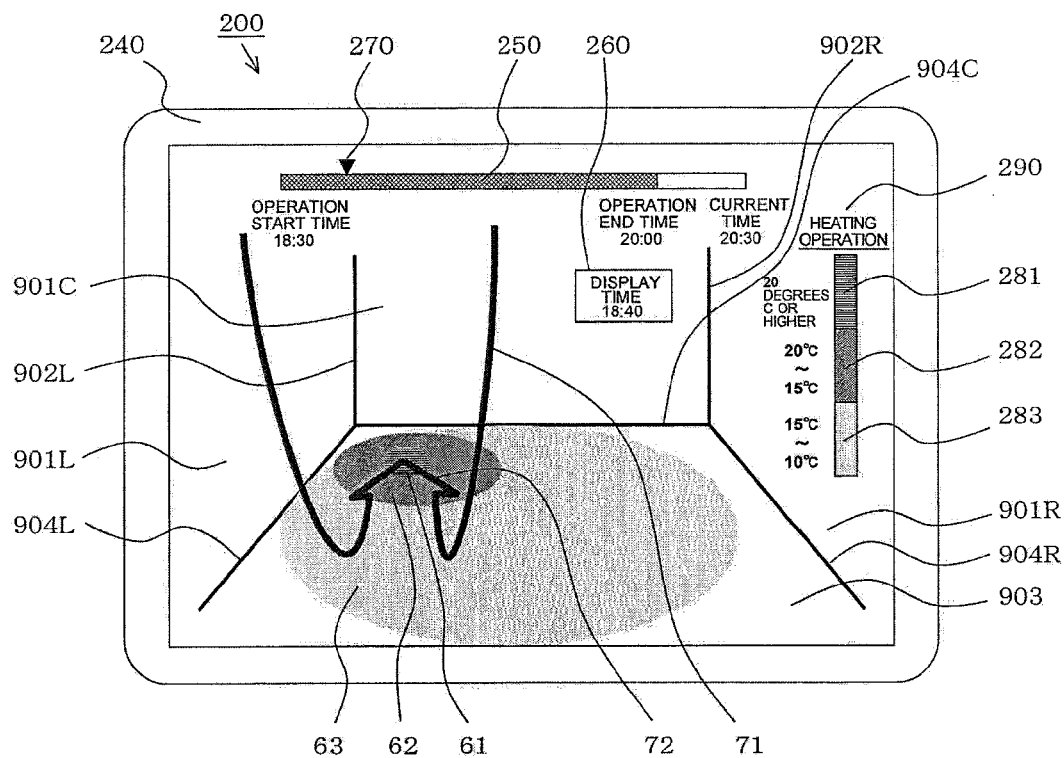
FIG. 8a is a front view for explaining an air-conditioning status image (heating operation by concentrated blowing) displayed on a display unit of the remote control illustrated in FIG. 5.

Referring to FIG. 8a, an air-conditioning status image, which is obtained by superimposing a thermal image acquired by the thermal image detection device 60 and an air flow image calculated by the arithmetic operation device 80 on a visible image captured by the indoor imaging device 50, is displayed on the display unit 240. A strip-shaped bar 250, which represents the operation start time, the operation end time, and the current time, is displayed horizontally along the upper side of the display unit 240. The period from the operation start time (18:30) to the operation end time (20:00) is illustrated in a different color, the display time is displayed in a display time field 260, and a display time cursor (for example, an arrow) 270 is displayed at a position corresponding to the display time in the time bar 250.

Furthermore, a strip-shaped temperature bar 280, which represents a temperature range, is displayed vertically along one side of the display unit 240. A high-temperature range 281 (for example, 20 degrees C. or higher), a medium temperature range 282 (for example, 15 to 20 degrees C.), and a low-temperature range 283 (for example, 10 to 15 degrees C.) are divided by different colors or patterns (hatching or satin process).

An indication "heating operation" is displayed in an operation mode field 290, which represents an operation mode, above the temperature bar 280.

As a visible image, the boundary between an opposite wall surface 901C that faces the indoor unit 100 and a left wall surface 901L on the left hand side when viewed from the indoor unit 100 is represented as a vertical line 902L, the boundary between the opposite wall surface 901C and a right wall surface 901R on the right hand side when viewed from the indoor unit 100 is represented as a vertical line 902R, the boundary between a floor surface 903 and the opposite wall surface 901C is represented as a horizontal line 9040, the boundary between the floor surface 903 and the left wall surface 901L is represented as an oblique line 904L, and the boundary between the floor surface 903 and the right wall surface 901R is represented as an oblique line 904R.

Furthermore, a thermal image, which represents the heat distribution on the floor surface 903, is expressed by colors or patterns applied to ranges 61, 62, and 63 having substantially circular or ring shapes, which represent portions between constant-temperature lines, and an air flow image is represented as an arrow 71.

That is, centered on a position corresponding to a blowing target point for conditioned air (position corresponding to a leading end 72 of the arrow 71) at the display time (18:40) after ten minutes have passed since start of an operation (18:30), the high-temperature range 61 having substantially a circular shape, the medium-temperature range 62 having a ring shape surrounding the high-temperature range 61, and the low-temperature range 63 having a ring shape surrounding the medium-temperature range 62 are displayed.

At this time, since only a short period of time has passed since the start of heating, the high-temperature range 61 is narrow and the medium-temperature range 62 is not much spread.

Figure 8B:
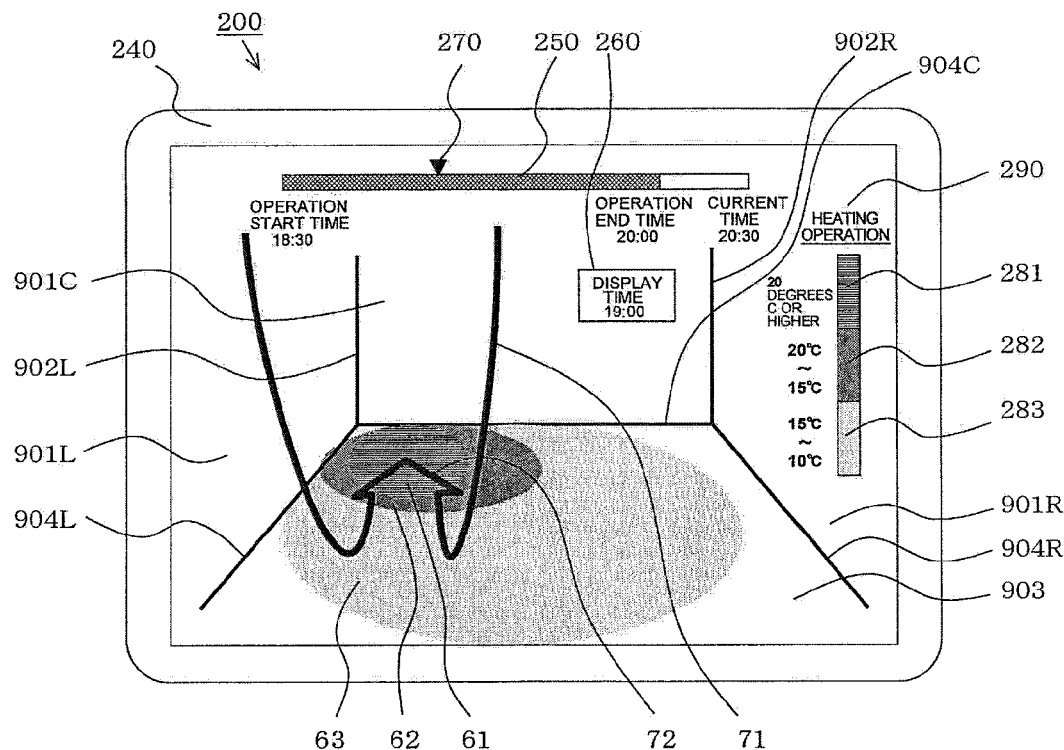
FIG. 8b is a front view for explaining an air-conditioning status image (heating operation by concentrated blowing) displayed on the display unit of the remote control illustrated in FIG. 5.

Referring to FIG. 8*b*, the display time is 19:00. Thus, thirty minutes have passed since the start of heating. At this time, compared to the case of the display time of 18:40, the high-temperature range 61 is significantly increased, and the medium-temperature range 62 is also increased.

Figure 9A:
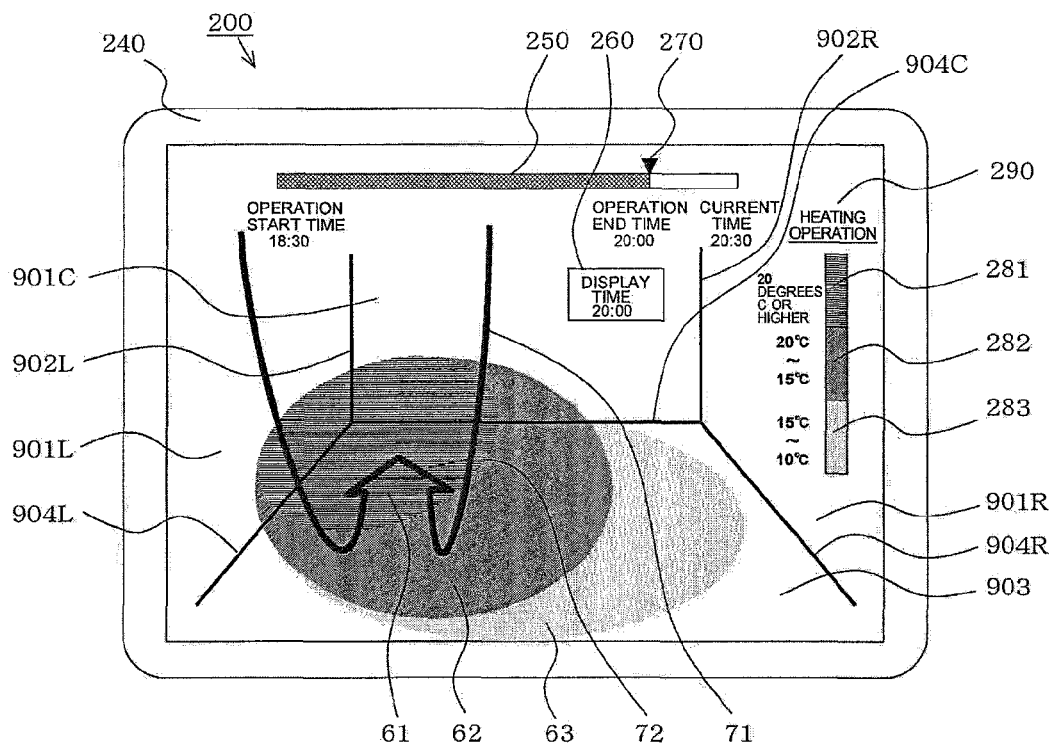
FIG. 9a is a front view for explaining an air-conditioning status image (heating operation by concentrated blowing) displayed on the display unit of the remote control illustrated in FIG. 5.

Referring to FIG. 9*a*, the display time is 20:00. Thus, ninety minutes have passed since the start of heating. At this time, compared to the case of the display time of 19:00, the high-temperature range 61 and the medium-temperature range 62 are significantly increased. The high-temperature range 61 and the medium-temperature range 62 are increased to portions of the left wall surface 901L and the opposite wall surface 901C near the floor surface 903 as well as the floor surface 903.

Figure 9B:
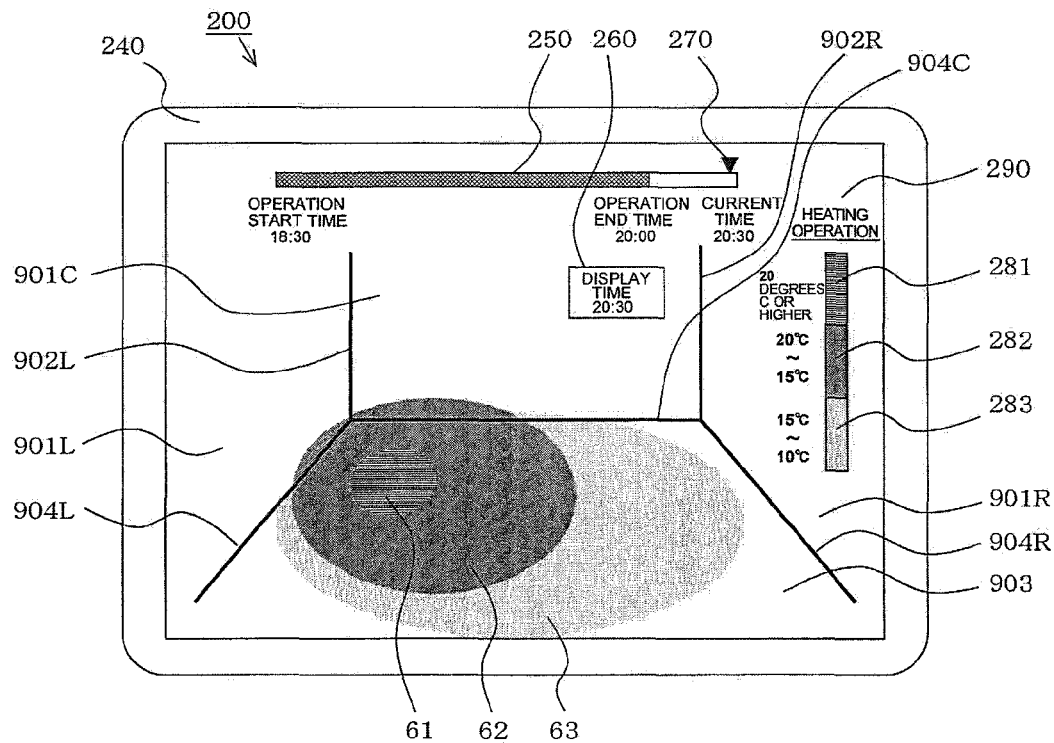
FIG. 9b is a front view for explaining an air-conditioning status image (heating operation by concentrated blowing) displayed on the display unit of the remote control illustrated in FIG. 5.

Referring to FIG. 9*b*, the display time is 20:30. Thus, thirty minutes have passed since termination of heating (20:00), and the arrow 71, which represents an air flow, is not displayed. However, since the floor surface 903 and the like have thermal inertia (store heating energy), the floor surface 903 is not rapidly cooled. Although the individual ranges become narrower, the high-temperature range 61 and the medium-temperature range 62 still exist.

As described above, since air-conditioning status images are displayed with time as moving images on the display unit 240 of the remote control 200, the user is able to visually understand the air-conditioning status of inside the room 900.

Thus, even in the case where the set temperature is increased when the user feels that heating is not sufficient, the user is able to understand that, in actuality, the user is located at a position outside the high-temperature range 61 because setting for the blowing direction of conditioned air is not appropriately made or the flow of conditioned air is blocked by furniture or the like. Since for the next and subsequent operations, by setting the blowing direction of conditioned air in such a manner that the position where the user is located is included in the high-temperature range 61 or by changing the arrangement of the furniture or the like so as not to cause the flow of conditioned air to be blocked, the user is able to obtain a comfortable heating environment without increasing the set temperature. Therefore, an energy-saving operation can be implemented.

The case where displaying is performed at a predetermined display speed has been described above. However, after pressing the display time fixing button 225 to temporarily display a still image, the display time fixing button 225 may be pressed again to display a moving image again. By moving the display time cursor 270 toward the operation start time while the display time backward button 224 is being pressed, moving images can be displayed in a repeated manner. Alternatively, by moving the display time cursor 270 toward the current time while the display time forward button 226 is being pressed, some images may be skipped and a moving image at a specific time may be displayed.

Furthermore, the display speed may be changed by pressing the display speed change button 223. For example, every time the display speed change button 223 is pressed, the ratio of the actual time to the displayed time (time shortening rate) is set to $\frac{1}{25}$, $\frac{1}{50}$, $\frac{1}{100}$, $\frac{1}{25}$, and so on in order. Instead of a button, a dial may be provided.

The display method change button 222 allows the user to select between an image of inside the room 900 when viewed from the indoor unit 100 as illustrated in FIG. 7 or 8, an image of the indoor unit 100 when viewed from the opposite wall surface 901C, and an image of inside the room 900 when viewed from above and allows the user to select displaying of the position of the user using a diagram in the individual images (this will be explained separately).

(Display of Air Flow)

The case where an air flow is represented by the arrow 71, in which the leading end 72 of the arrow 71 represents the direction of the air flow and the thickness (or density) of the solid lines bordering the arrow 71 represents the strength of the air flow. That is, strong wind is expressed using thickened solid lines (with an increased width or in a darker color) that border the arrow 71, and weak wind is expressed using thinned solid lines (with a decreased width or in a lighter color). In the present invention, color means achromatic color or chromatic color.

Furthermore, the present invention is not limited to illustrating an air flow using the single arrow 71. By illustrating air flows using a plurality of flow lines and adding arrows at leading ends of the individual flow lines, the directions of the air flows may be represented. In addition to this, by changing the distance between the flow lines (the number of flow lines) or making the distance between the flow lines (the number of flow lines) to be constant, the strength of air flows may be represented according to the thicknesses (widths) or densities of the flow lines. At this time, flow lines may be illustrated as solid lines, broken lines, or dotted lines. Furthermore, in the case where the direction of an air flow is apparent according to the relationship with a thermal image representing heat distribution, arrows at the leading ends of flow lines may be omitted.

(Example 2 of Air-Conditioning Status Image)

FIGS. 10 and 11 are front views for explaining air-conditioning status images in the indoor unit of the air-conditioning apparatus according to Embodiment 1 of the present invention, and of a display unit of a remote control in the case where a heating operation is performed by distributed (swing) blowing.

FIGS. 10 and 11 illustrate air-conditioning status images for a period of time from the start to stop of the latest heating operation that are stored in the storage device 90 and are displayed. The same parts as those in FIGS. 8 and 9 are referred to with the same reference signs and part of explanation will be omitted.

Figure 10A:
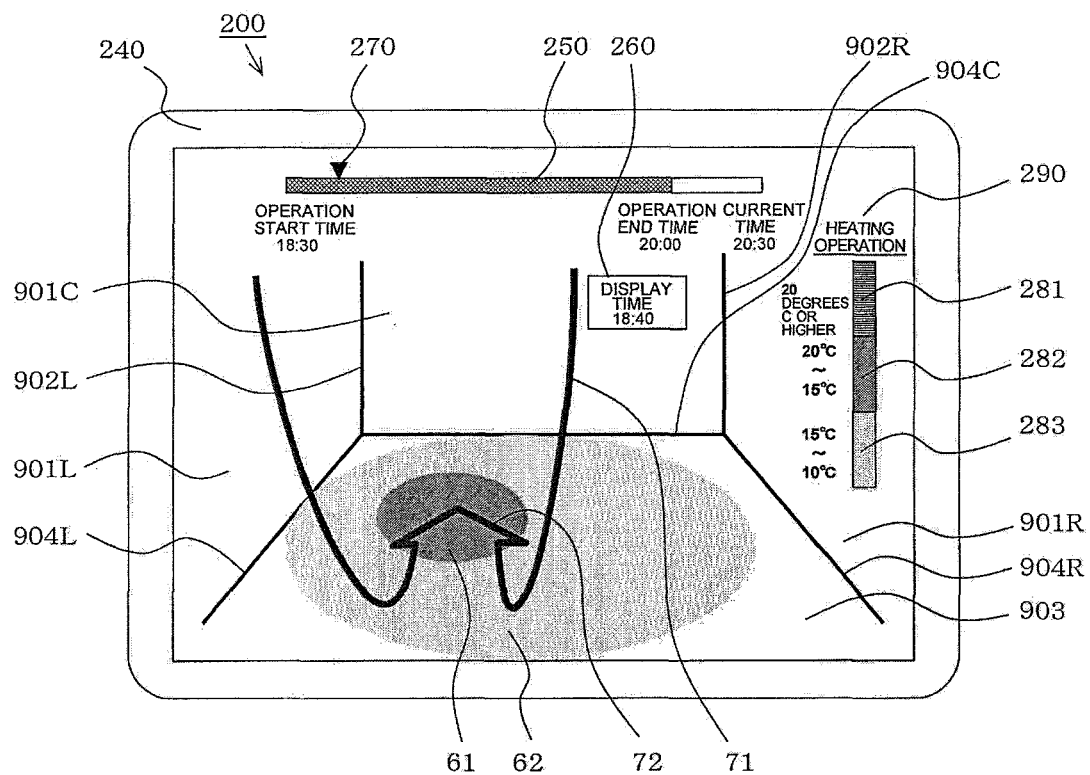
FIG. 10a is a front view for explaining an air-conditioning status image (heating operation by distributed blowing) displayed on the display unit of the remote control illustrated in FIG. 5.

Referring to FIG. 10a, at the display time (18:40) after ten minutes have passed since start of an operation (18:30), conditioned air extends to a blowing target point by distributed blowing. Thus, the leading end 72 of the arrow 71 representing the air flow of conditioned air is not a sole point but extends over a range of a specific width (although only one arrow 71 is illustrated since the arrow 71 at a specific point in time in a moving image is displayed, if an arrow 71 before the specific period of time is expressed as a light arrow and an arrow 71 at the specific point in time is expressed as a dark arrow, the arrow 71 expressed as a light arrow and the arrow 71 expressed as a dark arrow are displayed in such a manner they are shifted from each other).

Thus, the medium-temperature range 62 having substantially a circular shape is instantly displayed over a range including a position corresponding to the leading end 72 of the arrow 71, and the low-temperature range 63 having a ring shape is displayed so as to surround the medium-temperature range 62.

At this time, it is clear that, although the high-temperature range 61 having a narrow area is displayed in the case of concentrated blowing (FIG. 7a) even when a short period of time has passed since the start of heating, the high-temperature range 61 is not formed in the case of swing (distributed) blowing.

Figure 10B:
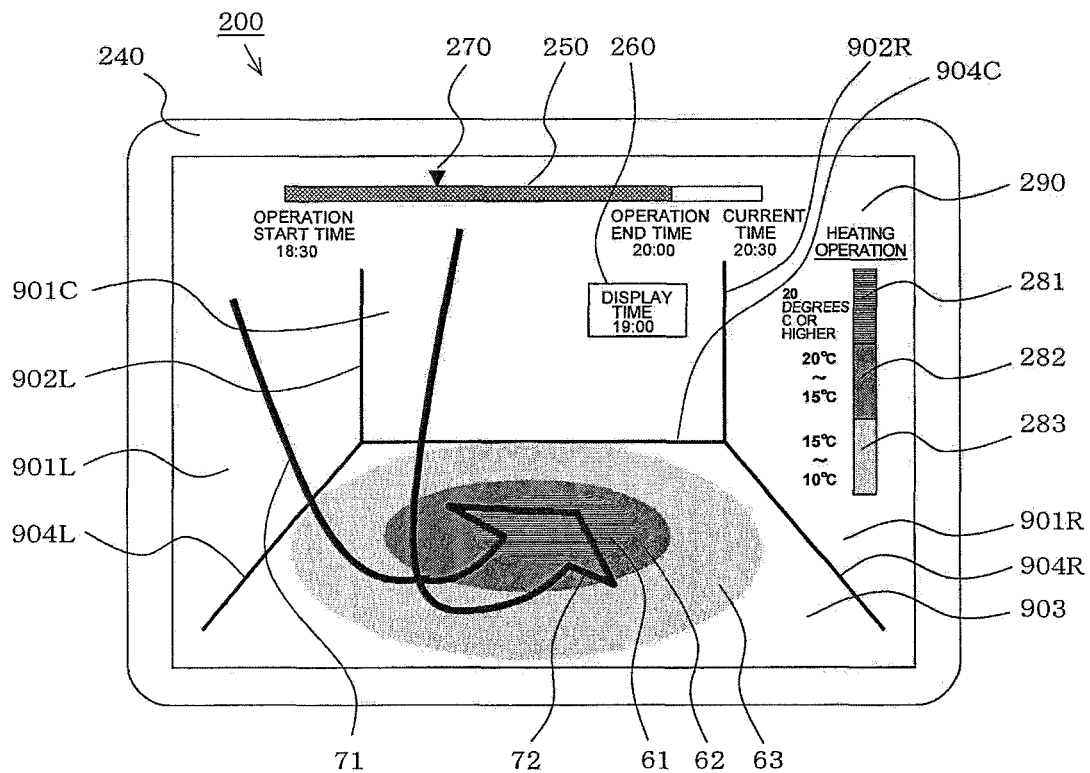
FIG. 10b is a front view for explaining an air-conditioning status image (heating operation by distributed blowing) displayed on the display unit of the remote control illustrated in FIG. 5.

Referring to FIG. 10b, the display time is 19:00. Thus, thirty minutes have passed since the start of heating. At this time, the high-temperature range 61 is formed, and the medium-temperature range 62 is increased compared to the case of the display time of 18:40.

Figure 11A:
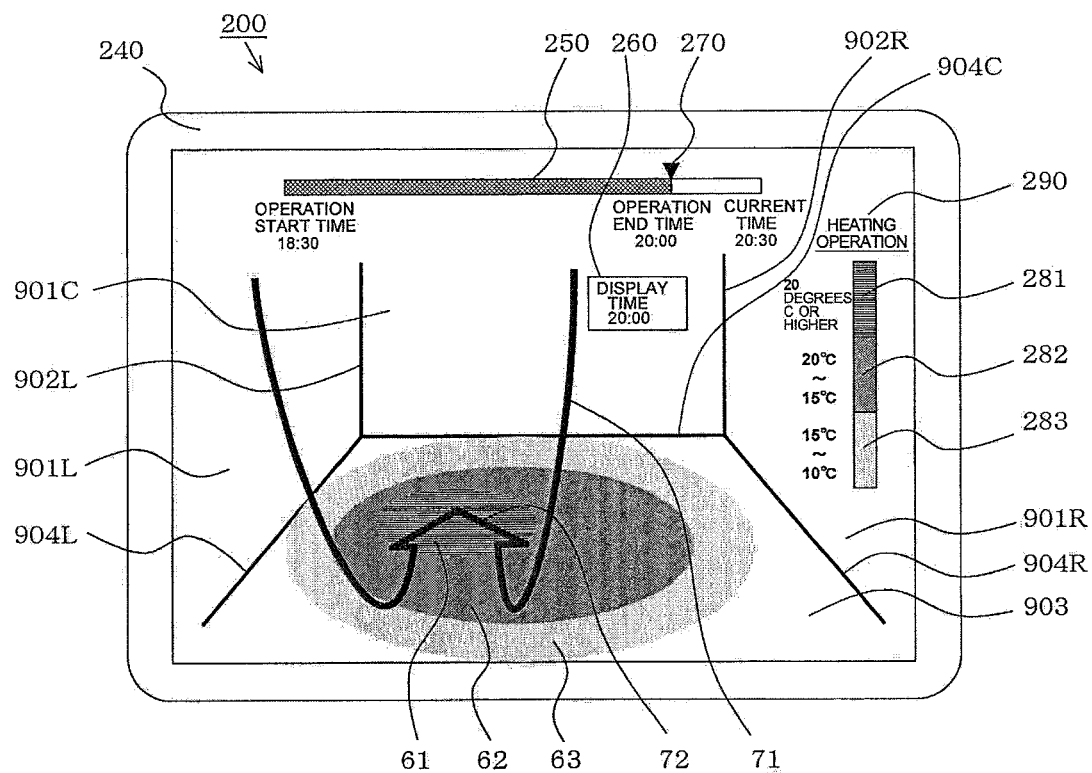
FIG. 11a is a front view for explaining an air-conditioning status image (heating operation by distributed blowing) displayed on the display unit of the remote control illustrated in FIG. 5.

Referring to FIG. 11a, the display time is 20:00. Thus, ninety minutes have passed since the start of heating. At this time, compared to the case of the display time of 19:00, the high-temperature range 61 and the medium-temperature range 62 on the floor surface 903 are significantly increased. However, the high-temperature range 61 and the medium-temperature range 62 do not extend to portions of the left wall surface 901L and the opposite wall surface 901C near the floor surface 903.

Figure 11B:
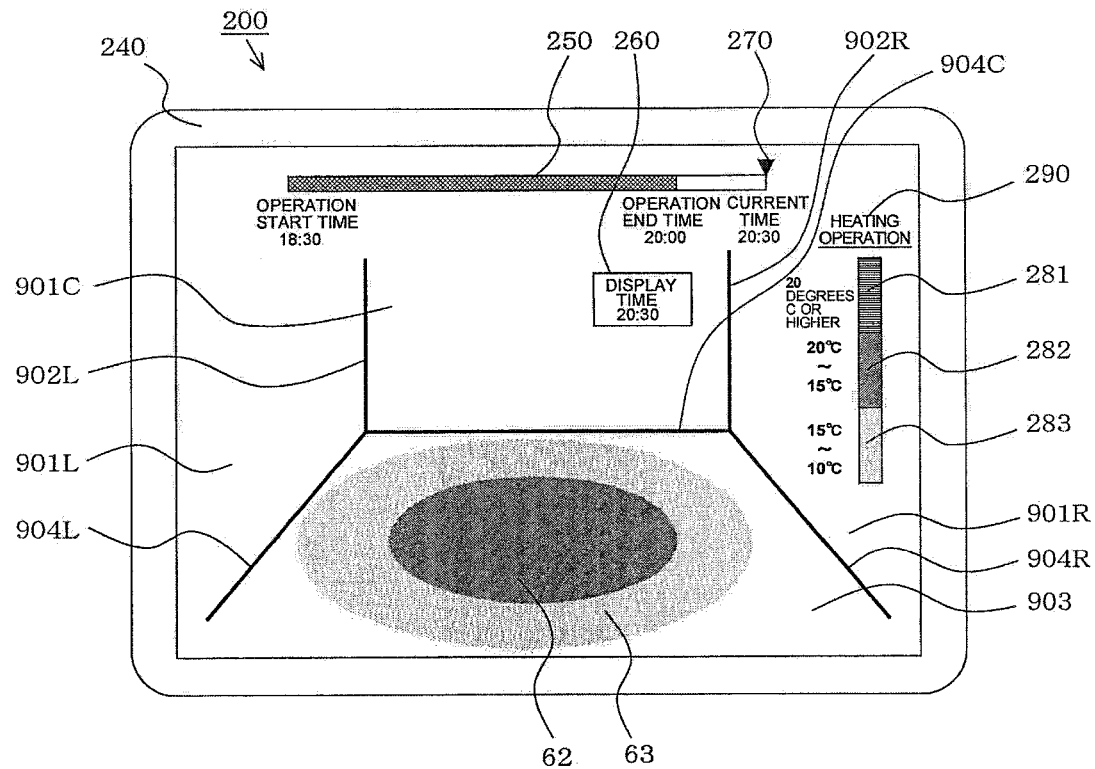
FIG. 11b is a front view for explaining an air-conditioning status image (heating operation by distributed blowing) displayed on the display unit of the remote control illustrated in FIG. 5.

Referring to FIG. 11b, the display time is 20:30. Thus, thirty minutes have passed since termination of heating (20:00), and the arrow 71, which represents an air flow, is not displayed. However, since the floor surface 903 and the like have thermal inertia (store heating energy), the floor surface 903 is not rapidly cooled. Although the medium-temperature range 62 and the low-temperature range 63 remain, since a local portion that was heated to high temperature does not exist, the high-temperature range 61 disappears.

As described above, since air-conditioning status images are displayed with time as moving images on the display unit 240 of the remote control 200, the user is able to visually understand the air-conditioning status of inside the room 900.

Thus, even in the case where the set temperature is increased when the user feels that heating is not sufficient, the user is able to understand that, in actuality, the user is located at a position outside the high-temperature range 61 because setting for the blowing direction of conditioned air is not appropriately made or the flow of conditioned air is blocked by furniture or the like. Since for the next and subsequent operations, by setting the blowing direction of conditioned air in such a manner that the position where the user is located is included in the high-temperature range 61 or by changing the arrangement of the furniture or the like so as not to cause the flow of conditioned air to be blocked, or further, by changing the position at which the user is located to the high-temperature range 61, the user is able to obtain a comfortable heating environment without increasing the set temperature. Therefore, an energy-saving operation can be implemented.

That is, the user is able to recognize that an area not covered by heating or cooling exists since the range heated or cooled is limited to an extremely narrow range, or in contrast, that an extremely wide range is heated or cooled in a wasteful manner or the position where the user is located is distant from an air flow. Thus, for example, the user is able to be given an occasion to devise to adjust the air flow direction adjusting device, to rearrange the position where furniture or the like inside the room is installed, or to understand a position suitable for the user to be located.

Accordingly, since a guideline for achieving a comfortable air-conditioning environment without providing ineffective air-conditioning can be acquired, energy saving can be implemented while a comfortable air-conditioning environment being maintained.

The case where a heating operation is performed has been exemplified in the explanation provided above. Since similar air-conditioning status images are displayed as moving images also in the case of a cooling operation, the user is able to visually understand the air-conditioning status of inside the room 900, and transition to an energy-saving operation can be achieved.

The case where displaying is performed at a predetermined display speed has been described above. However, after pressing the display time fixing button 225 to temporarily display a still image, the display time fixing button 225 may be pressed again to display a moving image again. By moving the display time cursor 270 toward the operation start time while the display time backward button 224 is being pressed, moving images can be displayed in a repeated manner. Alternatively, by moving the display time cursor 270 toward the current time while the display time forward button 226 is being pressed, some images may be skipped and a moving image at a specific time may be displayed.

Furthermore, the display speed may be changed by pressing the display speed change button 223. For example, every time the display speed change button 223 is pressed, the ratio of the actual time to the displayed time (time shortening rate) is set to $\frac{1}{25}$, $\frac{1}{50}$, $\frac{1}{100}$, $\frac{1}{25}$, and so on in order. Instead of a button, a dial may be provided.

The display method change button 222 allows the user to select between an image of inside the room 900 when viewed from the indoor unit 100 as illustrated in FIG. 7 or 8, an image of the indoor unit 100 when viewed from the opposite wall surface 901C, and an image of inside the room 900 when viewed from above and allows the user to select displaying of the position of the user using a diagram in the individual images (this will be explained separately).

(Display Method of Air-Conditioning Status Image)

Figure 12:
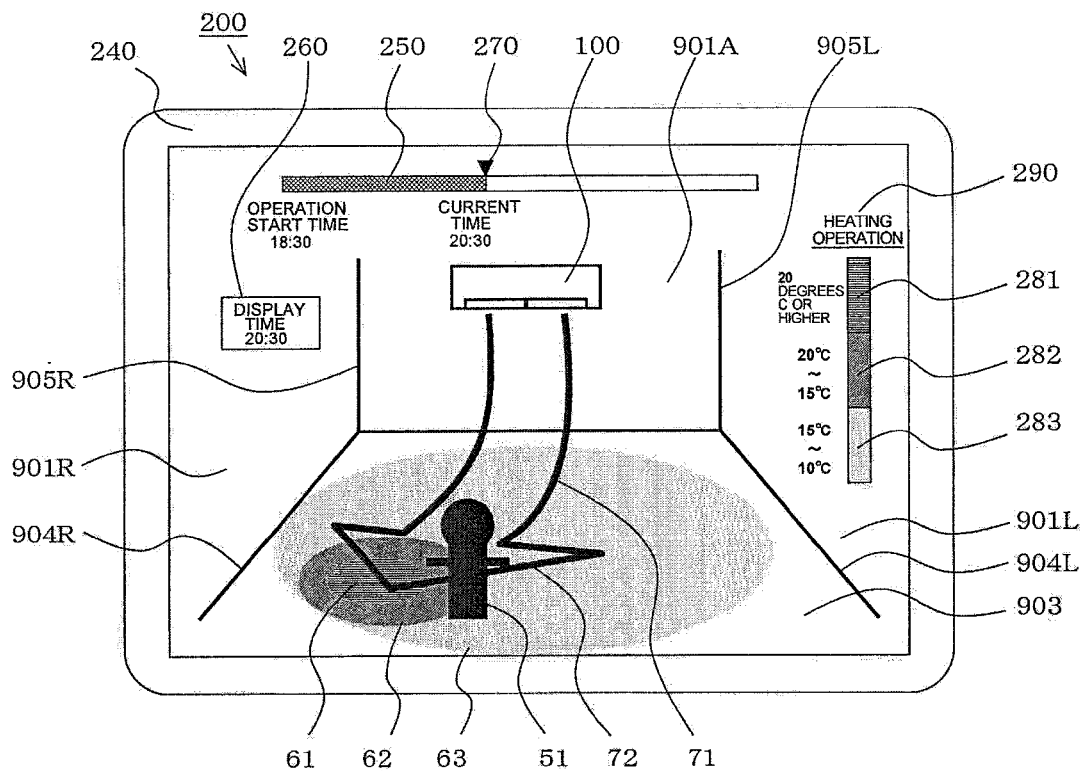
FIG. 12 is a front view for explaining a display method for an air-conditioning status image (air-conditioning status image when viewed toward the indoor unit during a heating operation) displayed on the display unit of the remote control illustrated in FIG. 5.
Figure 13:
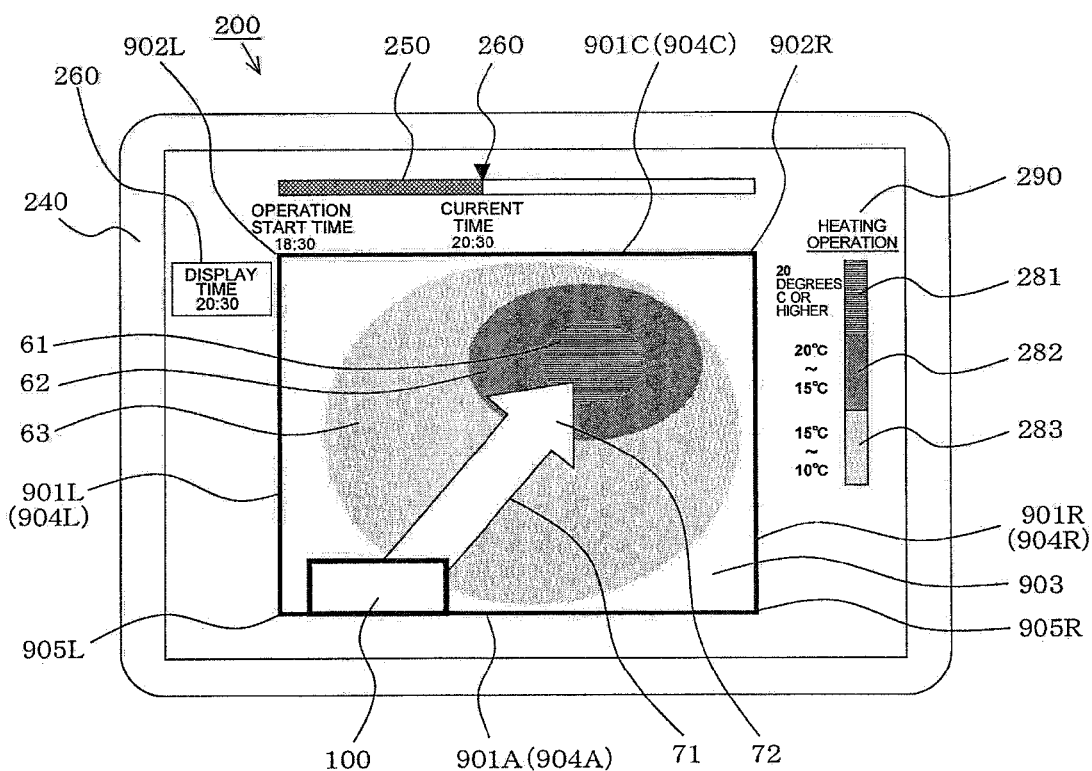
FIG. 13 is a front view for explaining a display method for an air-conditioning status image (air-conditioning status image when viewed toward a floor surface during the heating operation) displayed on the display unit of the remote control illustrated in FIG. 5.
Figure 14:
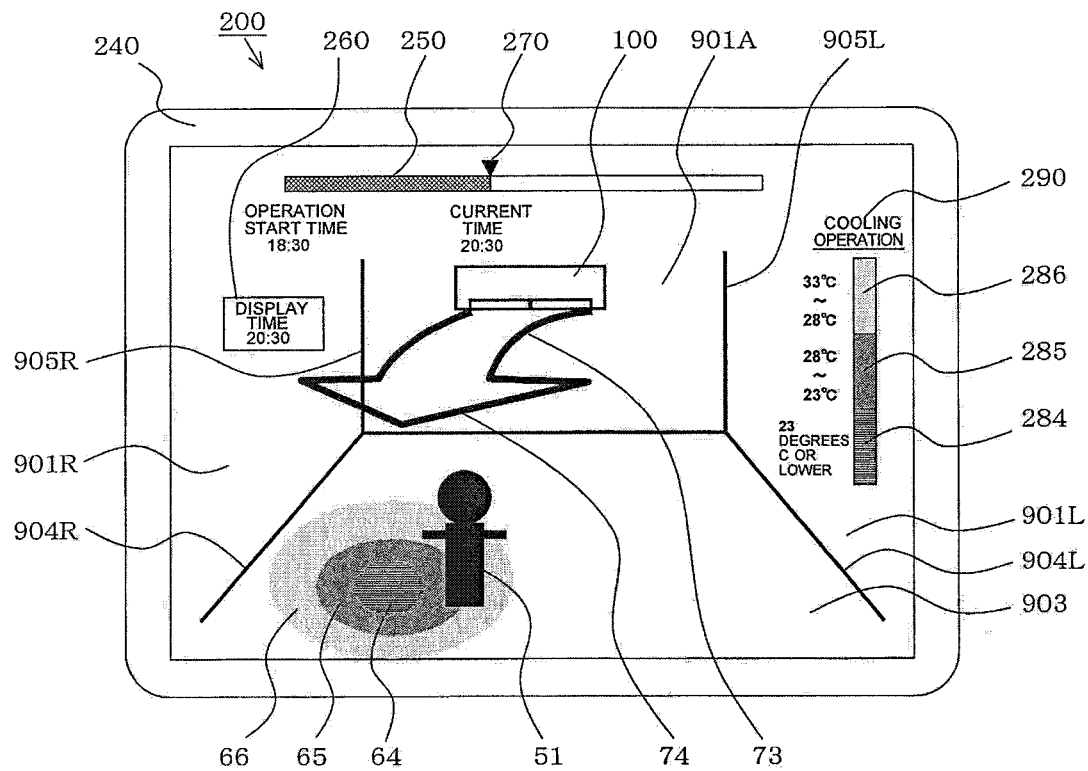
FIG. 14 is a front view for explaining a display method for an air-conditioning status image (air-conditioning status image when viewed toward the indoor unit during a cooling operation) displayed on the display unit of the remote control illustrated in FIG. 5.
Figure 15:
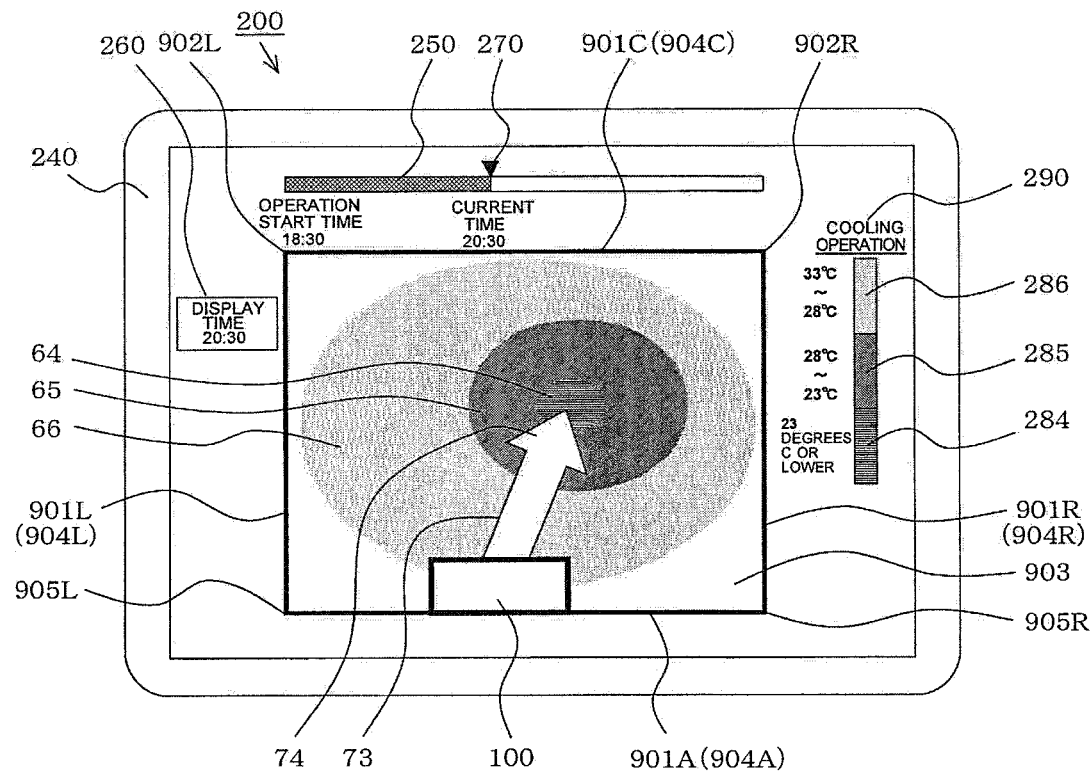
FIG. 15 is a front view for explaining a display method for an air-conditioning status image (air-conditioning status image when viewed toward the floor surface during the cooling operation) displayed on the display unit of the remote control illustrated in FIG. 5.

FIGS. 12 to 15 are front views of a display unit of a remote control for explaining a display method of an air-conditioning status image displayed on the display unit of the remote control for the indoor unit of the air-conditioning apparatus according to Embodiment 1 of the present invention. FIG. 12 illustrates an air-conditioning status image when viewed toward the indoor unit during a heating operation. FIG. 13 illustrates an air-conditioning status image when viewed toward the floor surface during the heating operation. FIG. 14 illustrates an air-conditioning status image when viewed toward the indoor unit during a cooling operation, and FIG. 15 illustrates an air-conditioning status image when viewed toward the floor surface during the cooling operation. The same parts as those in FIGS. 8 to 11 are referred to with the same reference signs and part of explanation for those same parts will be omitted.

FIGS. 8 to 11 illustrate air-conditioning status images when the room 900 is viewed from the indoor unit 100 (the installation wall surface 901A). Switching to the display method as illustrated in FIG. 12 or the like is achieved by pressing the display method change button 222.

FIG. 12 illustrates an air-conditioning status image when the direction toward the indoor unit 100 (the installation wall surface 901A) is viewed from the opposite wall surface 9010 during a heating operation. Since the time bar 250, the display time field 260, the display time cursor 270, the temperature bar 280, and the operation mode field 290 are the same as those illustrated in FIGS. 8 and 9, explanation for those parts will be omitted.

Since a visible image captured by the indoor imaging device 50 does not include the indoor unit 100 and the installation wall surface 901A, installation position information of the indoor unit 100 is input in advance when the indoor unit 100 is installed. Thus, on the basis of the visible image captured by the indoor imaging device 50 and the installation position information of the indoor unit 100, the arithmetic operation device 80 determines, by an arithmetic operation, a vertical line 905L, which is the boundary between the installation wall surface 901A, on which the indoor unit 100 is installed, and the left wall surface 901L, which is on the left hand side when viewed from the indoor unit 100, a vertical line 905R, which is the boundary between the installation wall surface 901A and the right wall surface 901R, which is on the right hand side when viewed from the indoor unit 100, and a horizontal line 904A, which is the boundary between the floor surface 903 and the installation wall surface 901A.

Furthermore, since a visible image captured by the indoor imaging device 50 is an image obtained when viewed toward the opposite wall surface 901C, the visible image is inverted into an image obtained when the indoor imaging device 50 is viewed from the opposite wall surface 901C. In addition, the figure of the user is displayed as a person mark 51. When the user moves, the position of the person mark 51 also changes. In the case where a plurality of users exist, a plurality of person marks 51 are displayed.

In FIGS. 8 to 11, the person mark 51 can be displayed when the display method change button 222 is operated.

Furthermore, a thermal image, which represents the heat distribution on the floor surface 903 when the visualization button 221 is pressed while a heating operation is being performed, is expressed by colors or patterns applied to the ranges 61, 62, and 63 having substantially circular or ring shapes, which represent portions between constant-temperature lines, and an air flow image is represented as the arrow 71.

That is, centered on a position corresponding to a blowing target point for conditioned air (position corresponding to the leading end 72 of the arrow 71) at the display time (20:30) after two hours have passed since the start of an operation (18:30), the high-temperature range 61 having substantially a circular shape, the medium-temperature range 62 having a ring shape surrounding the high-temperature range 61, and the low-temperature range 63 having a ring shape surrounding the medium-temperature range 62 are displayed.

Thus, since the user is able to understand the air-conditioning status in which the user is located while viewing the indoor unit 100 and the back of the user being viewed, the user is able to set effective air-conditioning conditions. Furthermore, by changing the position at which the user is located, a comfortable air-conditioning environment can be achieved, and energy saving can be implemented.

FIG. 13 illustrates an air-conditioning status image, which is obtained by viewing the air-conditioning status image illustrated in FIG. 12 toward the floor surface 903 from vertically above. Thus, in FIG. 13, explanation for the same details as in FIG. 12 will be omitted. Although the person mark 51 is not displayed in FIG. 13, the person mark 51 can be displayed when the display method change button 222 is operated.

Since FIG. 13 corresponds to a view obtained when the floor surface 903 is viewed from directly above the floor surface 903, the user is able to understand the state (a change in the state) of the high-temperature range 61, the medium-temperature range 62, the low-temperature range 63, or an air flow image that is the arrow 71 with a sense of distance is taken into consideration. Thus, similar to the display of FIG. 12, a comfortable air-conditioning environment can be achieved, and energy saving can be implemented.

FIG. 14 illustrates an air-conditioning status image obtained when the direction toward the indoor unit 100 (the installation wall surface 901A) is viewed from the opposite wall surface 901C during a cooling operation. The time bar 250, the display time field 260, and the display time cursor 270 are the same as those in FIGS. 12 and 13 illustrating the case of a heating operation. However, the temperature bar 280 differs from that in FIGS. 12 and 13.

That is, in the temperature bar 280, a high-temperature range 286 (for example, 28 to 33 degrees C.), a medium-temperature range 285 (for example, 23 to 28 degrees C.), and a low-temperature range 284 (for example, 23 degrees C. or lower) are divided in different colors or patterns (hatching or satin process).

As in FIGS. 12 and 13, the arithmetic operation device 80 determines, by an arithmetic operation, the vertical line 905L, the vertical line 905R, and the horizontal line 904A.

Furthermore, since a visible image captured by the indoor imaging device 50 is an image obtained when viewed toward the opposite wall surface 901C, the image is inverted into an image obtained when viewed toward the indoor imaging device 50 from the opposite wall surface 901C. The figure of the user is displayed as the person mark 51. When the user moves, the position of the person mark 51 also changes. In the case where a plurality of users exist, a plurality of person marks 51 are displayed.

In FIGS. 8 to 11, the person mark 51 can be displayed when the display method change button 222 is operated.

A thermal image, which represents the heat distribution on the floor surface 903 when the visualization button 221 is pressed while a cooling operation is being performed, is expressed by colors or patterns applied to ranges 64, 65, and 66 having substantially circular or ring shapes, which represent portions between constant-temperature lines, and an air flow image is represented as an arrow 73.

That is, centered on a position corresponding to a blowing target point for conditioned air (position corresponding to a leading end 74 of the arrow 73) at the display time (20:30) after two hours have passed since the start of an operation (18:30), the low-temperature range 64 having substantially a circular shape, the medium-temperature range 65 having a ring shape surrounding the low-temperature range 64, and the high-temperature range 66 having a ring shape surrounding the medium-temperature range 65 are displayed.

Thus, since the user is able to understand the air-conditioning status in which the user is located while viewing the indoor unit 100 and the back of the user being viewed, the user is able to set effective air-conditioning conditions. Furthermore, by changing the position at which the user is located, a comfortable air-conditioning environment can be achieved, and energy saving can be implemented.

FIG. 15 illustrates an air-conditioning status image, which is obtained by viewing the air-conditioning status image illustrated in FIG. 14 toward the floor surface 903 from vertically above. Thus, in FIG. 15, explanation for the same details as in FIG. 14 will be omitted. Although the person mark 51 is not displayed in FIG. 15, the person mark 51 can be displayed when the display method change button 222 is operated.

Since FIG. 15 corresponds to a view obtained when the floor surface 903 is viewed from directly above the floor surface 903, the user is able to understand the state (a change in the state) of the low-temperature range 64, the medium-temperature range 65, the high-temperature range 66, or an air flow image that is the arrow 73 with a sense of distance is taken into consideration. Thus, similar to the display of FIG. 14, a comfortable air-conditioning environment can be achieved, and energy saving can be implemented.

Embodiment 2

Figure 16:
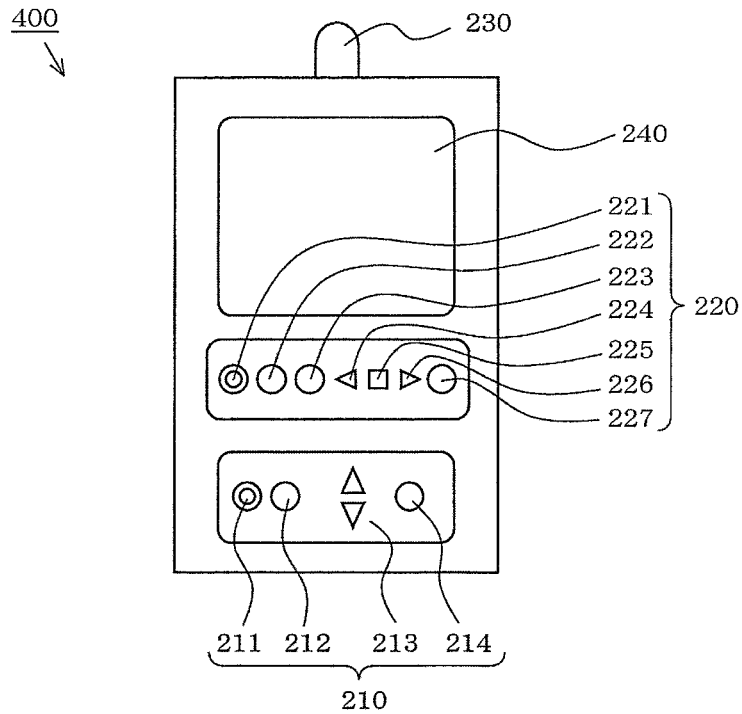
FIG. 16 is a front view of a remote control of an indoor unit of an air-conditioning apparatus of Embodiment 2 of the present invention.
Figure 17:
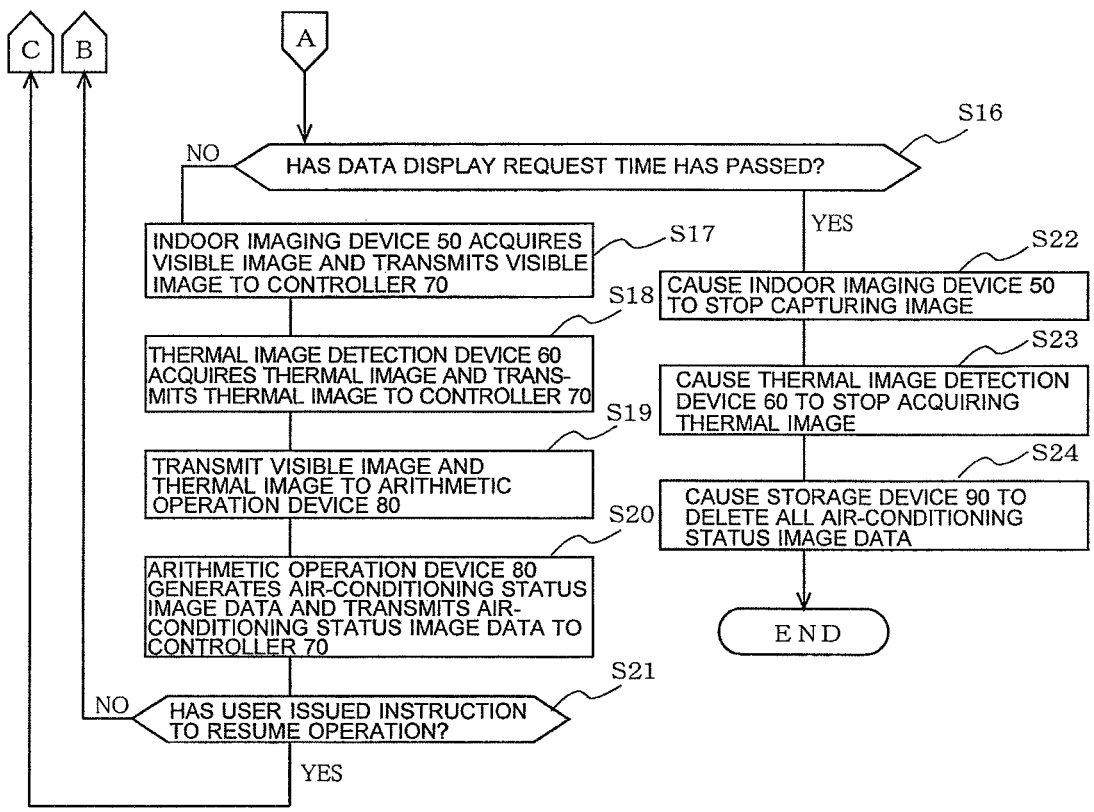
FIG. 17 is a flowchart for explaining the flow of control for the indoor unit of the air-conditioning apparatus of Embodiment 2 of the present invention.

FIGS. 16 to 19 explain an indoor unit of an air-conditioning apparatus according to Embodiment 2 of the present invention. FIG. 16 is a front view of a remote control, FIG. 17 is part of a flowchart for explaining the flow of control for displaying an air-conditioning status image, and FIGS. 18 and 19 are front views of a display unit of a remote control for explaining the air-conditioning status image in the case where a cooling operation is performed by concentrated (spot) blowing. The same parts as those in Embodiment 1 are referred to with the same reference signs and part of explanation for those same parts will be omitted. These figures are schematically illustrated and do not intend to limit the present invention to the illustrated forms.

(Remote Control)

Referring to FIG. 16, in a remote control 400 (hereinafter, referred to as a "remote control") of an indoor unit 300 (hereinafter, referred to as an "indoor unit") of an air-conditioning apparatus, the air-conditioning status image request unit 220, which issues a request for transmission of an air-conditioning status image, includes a display time setting button 227 for setting the air-conditioning status image actual time (hereinafter, referred to as an "image actual time"), which is the length of the actual time of air-conditioning status images displayed on the display unit 240. Thus, by operating the display time setting button 227, air-conditioning status images for the period of time from the time that is the set image actual time (for example, six hours, twelve hours, or the like) before the current time to the current time can be displayed. Accordingly, air-conditioning status images for the last operation or the operation before the last operation as well as the current operation can be displayed on the display unit 240 of the remote control 400.

At this time, the controller 70 calculates the maximum storage capacity for the storage device 90 corresponding to the set image actual time (corresponding to the number of air-conditioning status images).

(Flow of Control)

Referring to FIG. 17, the control flow is basically the same as that for the indoor unit 100 (Embodiment 1).

That is, although all the air-conditioning status images stored in the storage device 90 are deleted (S24) when the operation of the indoor unit 100 is resumed (S21), air-conditioning status image data are stored into the storage device 90 until the maximum storage capacity has been reached even after the operation of the indoor unit 300 is resumed (S21). That is, in the case where the operation is resumed (S21), the indoor imaging device 50 acquires visible images by capturing images of inside the room 900 with predetermined intervals (for example, ten seconds). Then, the indoor unit returns to the step (S3 in FIG. 6) for transmitting the visible images to the controller 70, and performs the step and later steps.

Thus, although air-conditioning status images for the current operation are displayed on the display unit 240 in the indoor unit 100, air-conditioning status images for the last operation or the operation before the last operation are also displayed before the air-conditioning status image for the current operation are displayed, as long as within the image actual time, in the indoor unit 300.

(Example 3 of Air-Conditioning Status Image)

FIGS. 18 and 19 are front views of the display unit 240 of the remote control 400 in the case where the indoor unit 300 performs a cooling operation by concentrated (spot) blowing. Conditioned air is blown in the narrow horizontal direction from the indoor unit 300 (not illustrated since the indoor unit 300 is located on the front side of the drawings).

Figure 18A:
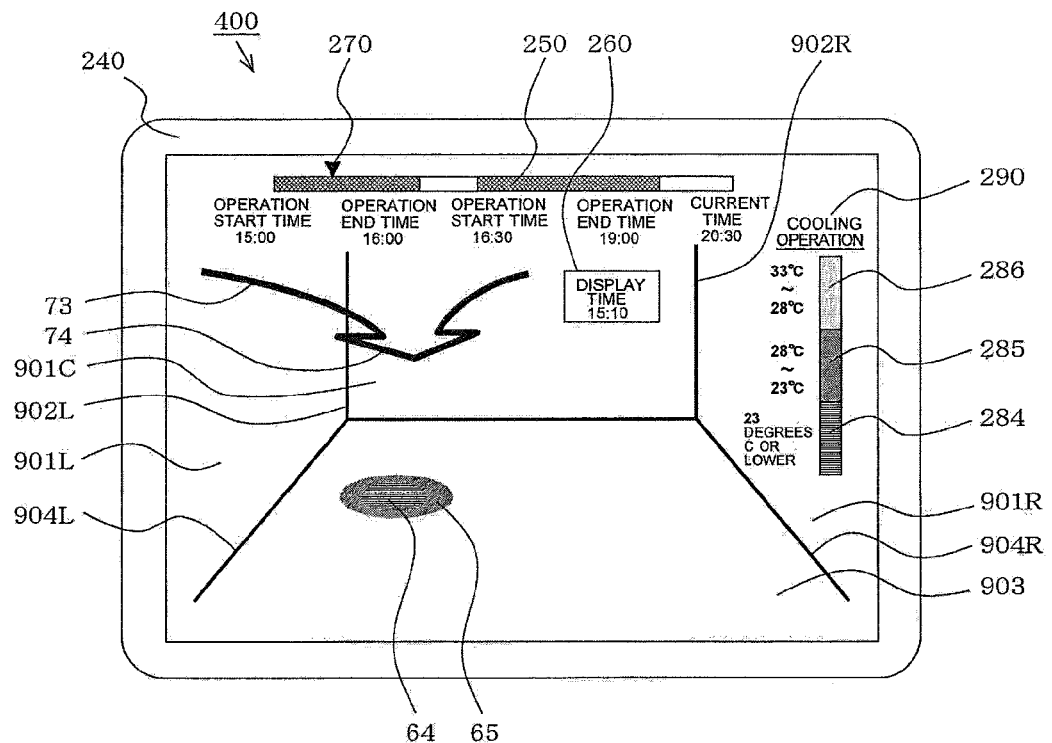
FIG. 18a is a front view for explaining a display method for an air-conditioning status image (cooling operation by concentrated blowing) displayed on a display unit of the remote control illustrated in FIG. 16.

Referring to FIG. 18a, similar to the case of a heating operation (FIGS. 8 and 9), the strip-shaped time bar 250, the display time cursor 270 (for example, an arrow), the strip-shaped temperature bar 280, and the operation mode field 290 are displayed on the display unit 240.

In the case where the image actual time is set to six hours, the current time (20:30) is displayed on the time bar 250. The section between the last operation start time (15:00) which is five and a half hours before the current time (20:30) and the last operation end time (16:00) and the section between the current operation start time (16:30) and the current operation end time (19:00), are displayed in color (color identification). The other time sections (16:00 to 16:30 and 19:00 to 20:30) are displayed without color (color identification). Thus, the user is able to understand at a glance that an operation is not being performed.

Then, the cursor (arrow) 270 is displayed at a position of the time bar 250 that corresponds to the display time (15:10), and the cursor (arrow) 270 moves at a set display (play back) speed. Since the display time can be changed when the display time backward button 224 or the display time forward button 226 is operated, the cursor (arrow) 270 can be moved, and an air-conditioning status image at a desired time can be displayed. Furthermore, by pressing the display time fixing button 225, an air-conditioning status image can be viewed as a still image (the same as in the case of the indoor unit 100).

Furthermore, due to the cooling operation, in the temperature bar 280, the high-temperature range 286 (for example, 28 to 33 degrees C.), the medium temperature range 285 (for example, 23 to 28 degrees C.), and the low-temperature range 284 (for example, 23 degrees C. or lower) are divided by different colors or patterns (hatching or satin process).

A thermal image, which represents the heat distribution on the floor surface 903, is expressed by colors or patterns applied to the ranges 64, 65, and 66 having substantially circular or ring shapes, which represent portions between constant-temperature lines, and an air flow image is represented as the arrow 73.

Centered on a position corresponding to a blowing target point for conditioned air (position corresponding to the leading end 74 of the arrow 73) at the display time (15:10) after ten minutes have passed since start of an operation (15:00), the low-temperature range 64 having substantially a circular shape and the medium-temperature range 65 having a ring shape surrounding the high-temperature range 64 are displayed. At this time, since only a short period of time has passed since the start of cooling, only a limited area of the floor surface 903 is cooled, and the temperature of a portion around the medium-temperature range 65 is 33 degrees C. or higher, which is similar to the temperature at the start of cooling.

Figure 18B:
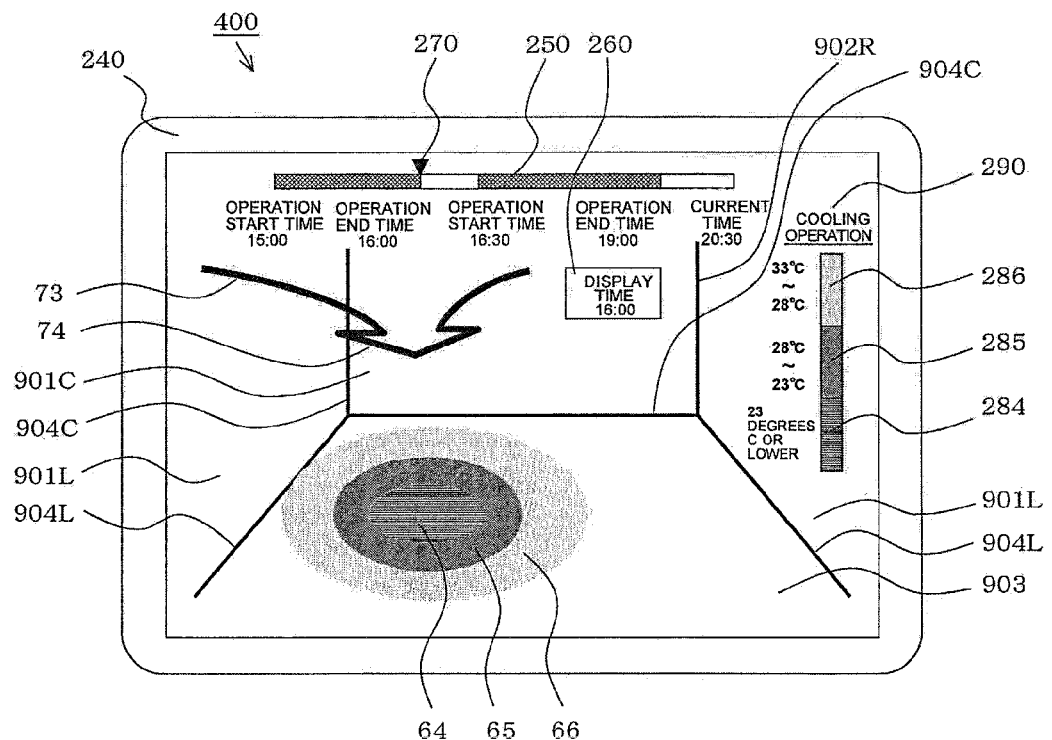
FIG. 18b is a front view for explaining a display method of the air-conditioning status image (cooling operation by concentrated blowing) displayed on the display unit of the remote control illustrated in FIG. 16.

Referring to FIG. 18b, the display time is 16:00. Thus, sixty minutes have passed since the start of cooling. At this time, compared to the case of the display time of 15:10 (after ten minutes have passed), the low-temperature range 64 and the medium-temperature range 65 are increased and the high-temperature range 66 appears around the medium-temperature range 65.

Figure 19A:
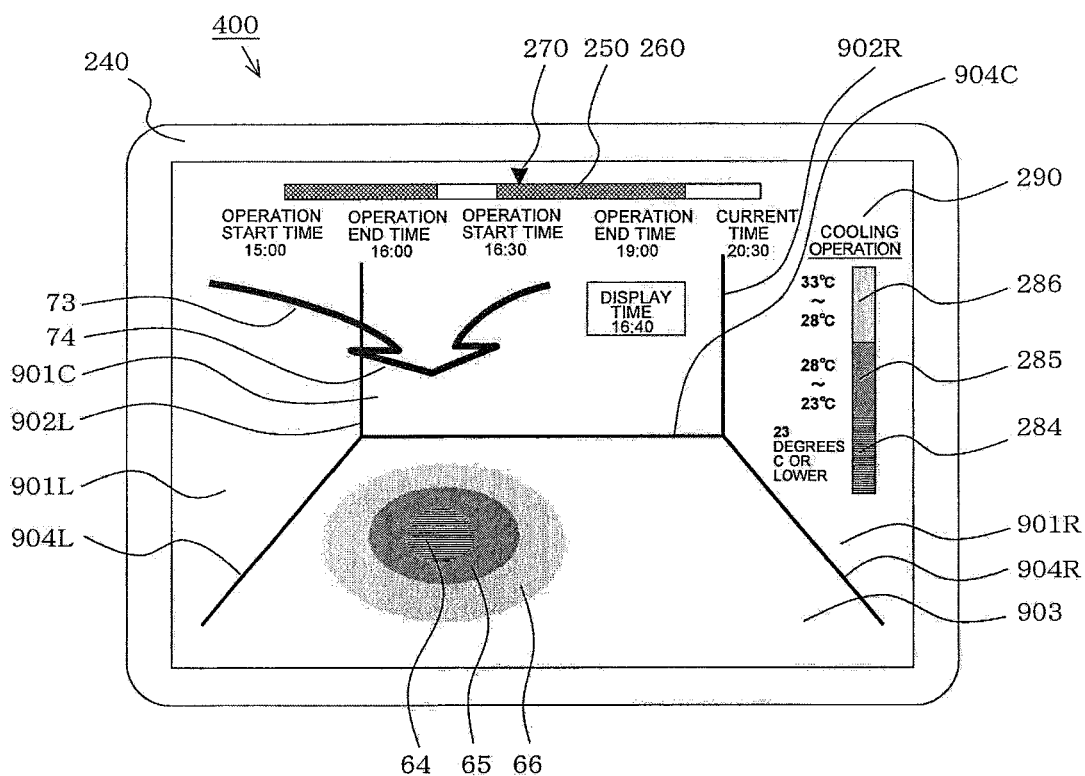
FIG. 19a is a front view for explaining a display method for the air-conditioning status image (cooling operation by concentrated blowing) displayed on the display unit of the remote control illustrated in FIG. 16.

Referring to FIG. 19a, the display time is 16:40. Thus, the air-conditioning status at the time ten minutes after resumption of the current cooling operation after termination of the last cooling operation (one hour) and a pause of thirty minutes is displayed.

That is, although only ten minutes have passed since the resumption of the current cooling operation, since the floor surface 903 has been cooled since the last cooling operation and the floor surface 903 has thermal inertia, the cooled range is extended to a wider range compared to the air-conditioning status (FIG. 18a) at the time ten minutes after the resumption of the last cooling operation. That is, the low-temperature range 64 and the medium-temperature range 65 become wider, and the high-temperature range 66 appears around the medium-temperature range 65.

Figure 19B:
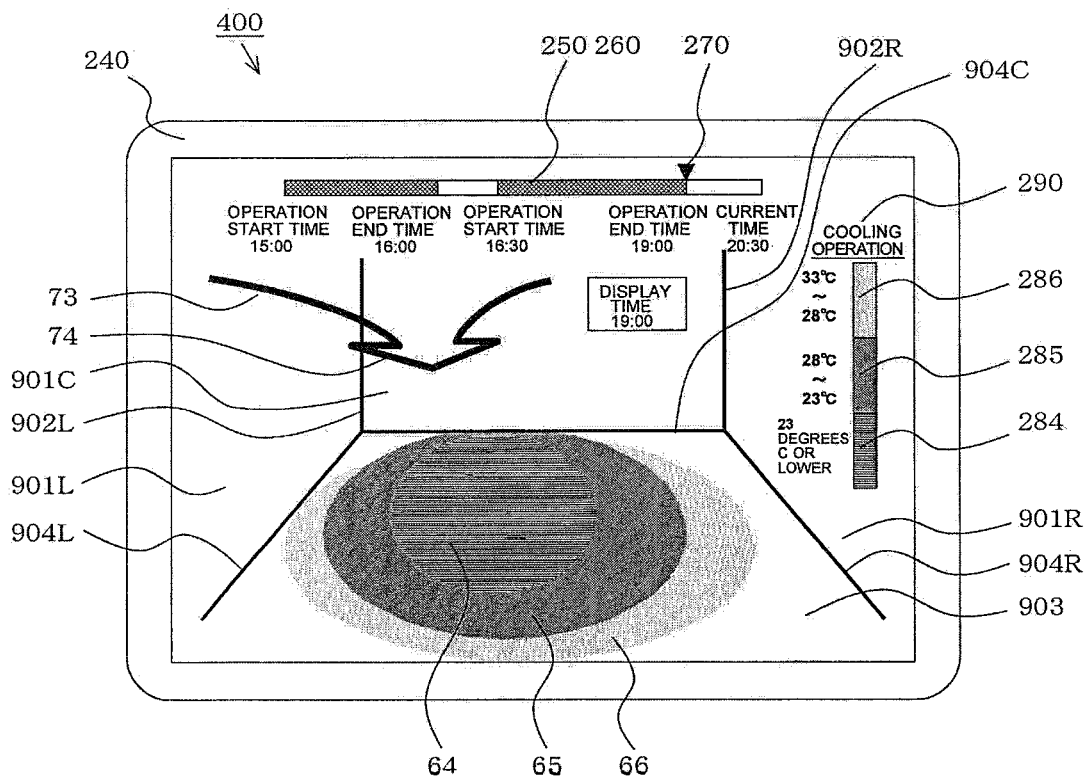
FIG. 19b is a front view for explaining a display method for the air-conditioning status image (cooling operation by concentrated blowing) displayed on the display unit of the remote control illustrated in FIG. 16.

Referring to FIG. 19b, the display time is 19:00. Since two hours and thirty minutes have passed since the start of the current cooling operation, a wide range on the floor surface 903 is cooled. A sufficiently wide low-temperature range 64 is displayed, the medium-temperature range 65 is displayed around the low-temperature range 64, and the high-temperature range 66 is displayed around the medium-temperature range 65. Only part of the floor surface 903 remains as a range of 33 degrees C. or higher that is not cooled (cooling is not apparent).

As described above, air-conditioning status images for the last cooling operation as well as the current cooling operation are displayed with time as moving images on the display unit 240 of the remote control 400. Thus, the user is able to visually understand the air-conditioning status of inside the room 900. Similar to the indoor unit 100 (Embodiment 1), the user is able to recognize that the set temperature of conditioned air or setting of the blowing direction is not appropriate or furniture or the like is placed at an inappropriate position.

In particular, since the user is able to understand the transition of air-conditioning status images for the last cooling operation or the operation before the last cooling operation and the transition of air-conditioning status images during a pause of a cooling operation, the user can gain the adjustment procedure for resumption of an operation and the knowledge of handling interruption of a cooling operation (for example, a cooing operation is not resumed and cooled ranges exist in a dispersed manner).

Thus, since a comfortable cooling environment can be attained without reducing the set temperature or by increasing the cooling interruption time, an energy-saving operation can be implemented. As described above, the display method of the display unit 240 can be changed by operating the display method change button 222 (see FIGS. 14 and 15).

Furthermore, although the case of a cooling operation has been exemplified above, similar air-conditioning status images can be displayed as moving images and similar effects can be achieved also in a heating operation.

REFERENCE SIGNS LIST

1: main unit, 2: front panel, 3: air inlet, 4: heat exchanger, 4a: heat exchanger front portion, 4b: heat exchanger upper front portion, 4c: heat exchanger upper rear portion, 5: fan, 6: air path, 7: air outlet, 8: drain pan, 8a: upper surface, 8b: lower surface, 9: up/down air flow direction plate, 9a: front up/down air flow direction plate, 9b: rear up/down air flow direction plate, 10: left/right air flow direction plate, 10L: left-side left/right air flow direction plate group, 10R: right-side left/right air flow direction plate group, 10a: left/right air flow direction plate, 10h: left/right air flow direction plate, 20L: left-side connecting bar, 20R: right-side connecting bar, 30L: left-side driving means, 40: main unit communication device, 50: indoor imaging device, 51: person mark, 60: thermal image detection device, 61: high-temperature range, 62: medium-temperature range, 63: low-temperature range, 64: low-temperature range, 65: medium-temperature range, 66: high-temperature range, 70: controller, 71: arrow, 72: leading end, 73: arrow, 74: leading end, 80: arithmetic operation device, 90: storage device, 100: indoor unit (Embodiment 1), 200: remote control (Embodiment 1), 210: air-conditioning condition input unit, 211: operation mode switching button, 212: operation start/end button, 213: temperature setting button, 214: blowing setting button, 220: air-conditioning status image request unit, 221: visualization button, 222: display method change button, 223: display speed change button, 224: display time backward button, 225: display time fixing button, 226: display time forward button, 227: display time setting button, 230: remote control communication unit, 240: display unit, 250: time bar, 260: display time field, 270: display time cursor, 280: temperature bar, 281: high-temperature range, 282: medium-temperature range, 283: low temperature range, 284: low-temperature range, 285: medium-temperature range, 286: high-temperature range, 290: operation mode field, 300: indoor unit (Embodiment 2), 400: remote control (Embodiment 2), 900: inside room, 901A: installation wall surface, 901C: opposite wall surface, 901L: left wall surface, 901R: right wall surface, 902L: vertical line, 902R: vertical line, 903: floor surface, 904A: horizontal line, 904C: horizontal line, 904L: oblique line, 904R: oblique line, 905L: vertical line, 905R: vertical line

The invention claimed is:

1. An indoor unit of an air-conditioning apparatus comprising:
   a main unit having an air inlet and an air outlet and being installed inside a room;
   a fan configured to suck indoor air from the air inlet and form an air path extending to the air outlet;
   a heat exchanger installed in the air path and configured to partially perform a role of a refrigeration cycle;
   an air flow direction adjusting device installed at the air outlet and configured to adjust a blowing direction of air conditioned by the heat exchanger;
   an indoor imaging device configured to capture an image of inside of the room;
   a thermal image detection device configured to acquire a thermal image of the inside of the room;
   a controller configured to transmit operation control information for controlling the heat exchanger, the fan, and the air flow direction adjusting device to the heat exchanger, the fan, and the air flow direction adjusting device;
   an arithmetic operation device configured to calculate, by an arithmetic operation, a flow of air blown from the air outlet on a basis of the operation control information, and generate an air-conditioning status image, which is an image obtained by superimposing the air flow calculated by the arithmetic operation and the thermal image representing temperature distribution acquired by the thermal image detection device on a visible image captured by the indoor imaging device;
   a storage device configured to store the air-conditioning status image; and
   a remote control configured to receive the air-conditioning status image stored in the storage device, the remote control including a display unit on which the received air-conditioning status image is displayed, and an air-conditioning status image request button that causes transmission of the plurality of air-conditioning status images stored in the storage device, wherein
   the arithmetic device generates a plurality of air-conditioning status images with predetermined time intervals,
   the plurality of air-conditioning status images are displayed as moving images on the display unit of the remote control, and
   when the air-conditioning status image request button is pressed, the air conditioning status images, which are stored, during a period from a beginning of a latest operation until the air-conditioning status image request button is pressed, are transmitted to the remote control and are displayed on the display unit.

2. The indoor unit of the air-conditioning apparatus of claim 1, wherein the thermal image is represented by constant-temperature lines and colors or gradation of colors applied between the constant-temperature lines.

3. The indoor unit of the air-conditioning apparatus of claim 1, wherein the air flow is represented by one or at least two arrows representing flow lines or solid lines, broken lines, or dotted lines representing flow lines.

4. The indoor unit of the air-conditioning apparatus of claim 1,
   wherein a maximum storage capacity, which is an upper limit of data stored in the storage device, is set in advance, and in a case where an amount of data stored in the storage device has reached the maximum storage capacity, the storage device deletes oldest data and adds and stores latest data.

5. The indoor unit of the air-conditioning apparatus of claim 2, wherein the air flow is represented by one or at least two arrows representing flow lines or solid lines, broken lines, or dotted lines representing flow lines.

6. The indoor unit of the air-conditioning apparatus of claim 2,
   wherein a maximum storage capacity, which is an upper limit of data stored in the storage device, is set in advance, and in a case where an amount of data stored in the storage device has reached the maximum storage capacity, the storage device deletes oldest data and adds and stores latest data.

7. The indoor unit of the air-conditioning apparatus of claim 1, wherein
   the arithmetic operation device is further configured to calculate an air flow target point at which the flow of air blown from the air outlet is positioned, and
   generate the air-conditioning status image, from data within the thermal image, to include at least two substantially circular thermal ranges located at the air flow target point, the at least two substantially circular thermal ranges overlap on the air-conditioning status image and indicate a first temperature range and a second temperature range that is lower than the first temperature range.

8. An indoor unit of an air-conditioning apparatus comprising:
   a main unit having an air inlet and an air outlet and being installed inside a room;
   a fan configured to suck indoor air from the air inlet and form an air path extending to the air outlet;
   a heat exchanger installed in the air path and configured to partially perform a role of a refrigeration cycle;
   an air flow direction adjusting device installed at the air outlet and configured to adjust a blowing direction of air conditioned by the heat exchanger;
   an indoor imaging device configured to capture an image of inside of the room;
   a thermal image detection device configured to acquire a thermal image of the inside of the room;
   a controller configured to transmit operation control information for controlling the heat exchanger, the fan, and the air flow direction adjusting device to the heat exchanger, the fan, and the air flow direction adjusting device;
   an arithmetic operation device configured to calculate, by an arithmetic operation, a flow of air blown from the air outlet on a basis of the operation control information, and generate an air-conditioning status image, which is an image obtained by superimposing the air flow calculated by the arithmetic operation and the thermal image representing temperature distribution acquired by the thermal image detection device on a visible image captured by the indoor imaging device;
   a storage device configured to store the air-conditioning status image; and
   a remote control configured to receive the air-conditioning status image stored in the storage device, the remote control including a display unit on which the received air-conditioning status image is displayed, and an air-conditioning status image request button that causes transmission of the plurality of air-conditioning status images stored in the storage device, and a display time setting button that sets an air-conditioning status image actual time, which is a length of an actual taking time for the air-conditioning status images displayed on the display unit, wherein the arithmetic device generates a plurality of air-conditioning status images with predetermined time intervals, the plurality of air-conditioning status images are displayed as moving images on the display unit of the remote control, and when the air-conditioning status image request button is pressed, the air-conditioning status images stored during a period from a time that goes back by the air-conditioning status image actual time that is set in advance by the display time setting button, until the air-conditioning status image request button is pressed are transmitted to the remote control and are displayed on the display unit.

9. The indoor unit of the air-conditioning apparatus of claim 8, wherein the arithmetic operation device is further configured to
calculate an air flow target point at which the flow of air blown from the air outlet is positioned, and
generate the air-conditioning status image, from data within the thermal image, to include at least two substantially circular thermal ranges located at the air flow target point, the at least two substantially circular thermal ranges overlap on the air-conditioning status image and indicate a first temperature range and a second temperature range that is lower than the first temperature range.

* * * * *